US007729681B2

(12) United States Patent
Someya

(10) Patent No.: US 7,729,681 B2
(45) Date of Patent: Jun. 1, 2010

(54) RADIO WAVE RECEIVING APPARATUS, RADIO WAVE RECEIVING CIRCUIT AND RADIO WAVE TIMEPIECE

(75) Inventor: Kaoru Someya, Kiyose (JP)

(73) Assignee: Casio Computer Co., Ltd., Tokyo (JP)

( * ) Notice: Subject to any disclaimer, the term of this patent is extended or adjusted under 35 U.S.C. 154(b) by 985 days.

(21) Appl. No.: 11/490,381

(22) Filed: Jul. 20, 2006

(65) Prior Publication Data

US 2007/0026832 A1 Feb. 1, 2007

(30) Foreign Application Priority Data

Jul. 27, 2005 (JP) ............................. 2005-217469
Nov. 30, 2005 (JP) ............................. 2005-345640

(51) Int. Cl.
*H04B 1/26* (2006.01)
*G04B 47/02* (2006.01)

(52) U.S. Cl. ....................... 455/314; 455/318; 455/323; 368/13

(58) Field of Classification Search ......... 455/313–314, 455/318, 319, 323, 334; 368/13, 47, 200
See application file for complete search history.

(56) References Cited

U.S. PATENT DOCUMENTS 4,580,289 A 4/1986 Enderby
5,422,863 A * 6/1995 Minowa et al. ............... 368/47
5,537,101 A * 7/1996 Nakajima et al. ...... 340/825.21
5,621,703 A * 4/1997 Kanesaka .................... 368/47
5,832,375 A 11/1998 Leisten et al.
5,930,697 A 7/1999 Boehme et al.
6,288,977 B1 9/2001 Yoshida et al.
2001/0043109 A1 11/2001 Masumoto et al.
2003/0117901 A1 * 6/2003 Takada et al. ................. 368/47
2005/0260957 A1 11/2005 Someya et al.

FOREIGN PATENT DOCUMENTS

EP 1 156 581 A2 11/2001
JP 2002-82187 A 3/2002
WO WO 2004/015880 A1 2/2004

OTHER PUBLICATIONS

Extended European Search Report dated May 13, 2009 (7 pages), issued in counterpart European Application Serial No. 06014946.5.

* cited by examiner

*Primary Examiner*—Nguyen Vo
(74) *Attorney, Agent, or Firm*—Frishauf, Holtz, Goodman & Chick, P.C.

(57) ABSTRACT

In the radio-wave receiving apparatus according to the invention, a signal received by a receiving antenna is amplified and the amplified received signal is input into a multi-stage frequency conversion circuit including a plurality of basic circuits connected in series. The multi-stage frequency conversion circuit converts the frequency of the received signal from the antenna into frequencies based on signals input from the frequency divider circuit sequentially, thereby to output a signal "a" which is obtained by conversions into gradually lower frequencies. Detection is performed by a detection circuit on the basis of the signal. Thereby, a radio-wave receiving apparatus which requires no local oscillating circuit nor a PLL circuit and is also stable in operation and high in accuracy is realized.

20 Claims, 22 Drawing Sheets

FIG.10

| BASIC SIGNAL FREQUENCY 32768 [Hz] | | | STANDARD RADIO WAVE | | | | |
|---|---|---|---|---|---|---|---|
| | | | (1) JAPAN 40000 [Hz] | (2) JAPAN 60000 [Hz] | (3) GERMANY 77500 [Hz] | (4) SWITZERLAND 75000 [Hz] | (5) CHINA 68500 [Hz] |
| SIGNAL "g" [Hz] | | FREQUENCY-DIVIDING RATIO | OUTPUT SIGNAL [Hz] | | | | |
| g1 | 65536 | 2 | | 5536(1) | 11964(1) | 6464(1) | 2964(1) |
| g2 | 32768 | 1 | 7232(1) | | | | |
| g3 | 16384 | 1/2 | | | | | |
| g4 | 8192 | 1/4 | 960(2) | 2656(2) | 3772(2) | 1272(2) | |
| g5 | 4096 | 1/8 | | | 324(3) | | |
| g6 | 2048 | 1/16 | | 608(3) | | | 916(2) |
| g7 | 1024 | 1/32 | 64(3) | | | 248(3) | 108(3) |
| g8 | 512 | 1/64 | | 96(4) | | | |
| g9 | 256 | 1/128 | | | 68(4) | 8(4) | |
| g10 | 128 | 1/256 | | 32(5) | | | |
| g11 | 64 | 1/512 | 0 | | 4(5) | | 44(4) |
| g12 | 32 | 1/1024 | | 0 | | | 8(5) |
| g13 | 16 | 1/2048 | | | | | |
| g14 | 8 | 1/4096 | | | | 0 | 0 |
| g15 | 4 | 1/8182 | | | 0 | | |
| g16 | 2 | 1/16384 | | | | | |

| USE/NON-USE SWITCHING SIGNAL | SW2 | SW3 |
|---|---|---|
| USE | TERMINAL a | TERMINAL a |
| NON-USE | TERMINAL b | TERMINAL b |

| USE/NON-USE SWITCHING SIGNAL | SW4 | SW5 |
|---|---|---|
| USE | ON | OFF |
| NON-USE | OFF | ON |

FIG.25

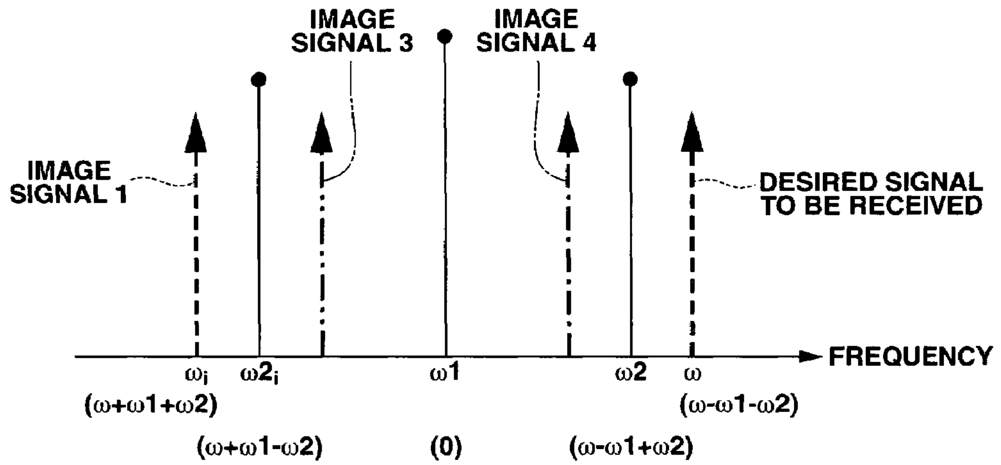

FIG.26

| ADDER-SUBTRACTOR (SUM/DIFFERENCE SWITCHING SIGNAL) | ADDER-SUBTRACTOR 6292a (SUM/DIFFERENCE SWITCHING SIGNAL 1) | ADDER-SUBTRACTOR 6292b (SUM/DIFFERENCE SWITCHING SIGNAL 2) | ADDER-SUBTRACTOR 6292c (SUM/DIFFERENCE SWITCHING SIGNAL 3) | ADDER-SUBTRACTOR 6292d (SUM/DIFFERENCE SWITCHING SIGNAL 4) |
|---|---|---|---|---|
| OPERATIONAL CONTENTS | SUBTRACTION | ADDITION | ADDITION | SUBTRACTION |
| | SUBTRACTION | ADDITION | SUBTRACTION | ADDITION |
| | ADDITION | SUBTRACTION | ADDITION | SUBTRACTION |
| | ADDITION | SUBTRACTION | SUBTRACTION | ADDITION |

RADIO WAVE RECEIVING APPARATUS, RADIO WAVE RECEIVING CIRCUIT AND RADIO WAVE TIMEPIECE

CROSS-REFERENCE TO RELATED APPLICATIONS

This application is based upon and claims the benefit of priority from the prior Japanese Patent Application No. 2005-217469, filed on Jury 27, 2005, and 2005-345640, filed on Nov. 30, 2005 and the entire contents of which are incorporated herein by reference.

BACKGROUND OF THE INVENTION

1. Field of the Invention

The present invention relates to, for example, a radio wave receiving apparatus for receiving standard radio waves, a radio wave receiving circuit and a radio wave timepiece.

2. Description of the Prior Art

Recently, in various countries, for example, Germany, England, Switzerland, Japan and the like, time data, that is, standard radio waves containing a time code are being transmitted. In Japan, long wave standard radio waves of 40 kHz and 60 kHz with time codes which are amplitude modulated, using the standard time format, are sent from two transmitting stations (Fukushima and Saga). This time codes are sent with the frame the cycle of which is 60 seconds, for every occasion when the place of minute of the exact time is updated, that is, for every 1 minute.

In recent years, so-called radio wave timepieces have been commercially available, in which standard radio waves containing the above-described time-codes are received to adjust the current time. Radio wave timepieces receive standard radio waves through a built-in antenna and perform amplification, detection and the like of the received signal, thereby to decode the time code and to adjust the current time. Radio wave timepieces capable of receiving a plurality of standard radio waves different in frequency, which are so-called multiband radio wave timepieces are known.

The radio-wave receiving apparatuses used in multiband radio wave timepieces are mainly based on a super-heterodyne system in which a received signal is synthesized with a local oscillating signal having a predetermined frequency to convert into an intermediate-frequency signal (IF signal), and the intermediate-frequency signal is referenced to perform detection. In this case, it is necessary to provide a local oscillating signal having a frequency, depending on the frequency of the standard radio wave to be received.

Therefore, the constitutions therefor are known, namely, (1) a constitution in which a plurality of local oscillating circuits are provided for outputting a local oscillating signal corresponding to the frequency of the standard radio wave to be received, (2) a constitution in which one unit of a local oscillating circuit is provided and the oscillatory frequency of the local oscillating circuit is changed over by turning a received frequency selecting switch ON/OFF, and (3) a constitution in which a local oscillating circuit is used also as an oscillating circuit for measuring time and the frequency is divided by the frequency-dividing ratio corresponding to the frequency of the standard radio wave which receives a reference frequency signal of 32.768 kHz output from the oscillating circuit for timepieces, to give a local oscillating signal.

However, the above-described conventional multiband radio wave receiving apparatus has the following problems. Namely, in the case of (1) where a plurality of oscillating circuits are provided corresponding to the frequencies of standard radio waves to be received, a radio wave receiving apparatus is inevitably provided with a larger sized circuit, thereby resulting in an increased cost and a restricted frequency of standard radio waves that can be received, which is a problem. Further, in the case of (2) where a local oscillating circuit is provided, the local oscillating circuit is constituted with, for example, a PLL (Phase Locked Loop) circuit having a VCO (Voltage Controlled Oscillator) and the PLL circuit requires a certain time from power-on to a stable operation and an oscillatory frequency output from the VCO may be rendered unstable, depending on setting of the reference frequency, which is also a problem.

In addition, in the case of (3) where the reference frequency signal for measuring time is frequency-divided to give a local oscillating signal, the frequency-divided signal is not in perfect coincident with the frequency necessary for converting the frequency of a received signal into an intermediate frequency, thereby to make it impossible to perform an accurate detection due to a difference in frequency, which is also a problem.

SUMMARY OF THE INVENTION

In the radio-wave receiving apparatus according to the invention, a signal received by a receiving antenna is amplified by an RF amplification circuit and the amplified received signal is input into a multi-stage frequency conversion circuit including a plurality of basic circuits connected in series. The multi-stage frequency conversion circuit converts the frequency of the received signal from the antenna into frequencies based on signals input from the frequency divider circuit sequentially, thereby to output a signal which is obtained by conversions into gradually lower frequencies. Detection is performed by a detection circuit on the basis of the signal. Thereby, a radio-wave receiving apparatus which requires no local oscillating circuit nor a PLL circuit and is also stable in operation and high in accuracy is realized.

BRIEF DESCRIPTION OF THE DRAWINGS

The present invention will become more fully understood from the detailed description given hereinafter and the accompanying drawings which are given by way of illustration only, and thus are not intended as a definition of the limits of the scope of the invention, and wherein:

FIG. 10 is a list of frequency-divided signals and signals subjected to frequency conversion (multiplication synthesis) in a case of receiving standard radio waves of individual frequencies in the present invention;

FIG. 25 is a conceptual view illustrating the relationship of frequencies between two signals generated by frequency conversion at the second stage in the exemplary modification of the present invention; and FIG. 26 is a table illustrating operational contents of individual adders-subtractors in the multi-stage frequency conversion circuit given in FIG. 22.

DESCRIPTION OF THE PREFERRED EMBODIMENTS

A preferred embodiment of the present invention will be described with reference to the attached drawings.

[Radio Wave Timepiece]

Figure 1:
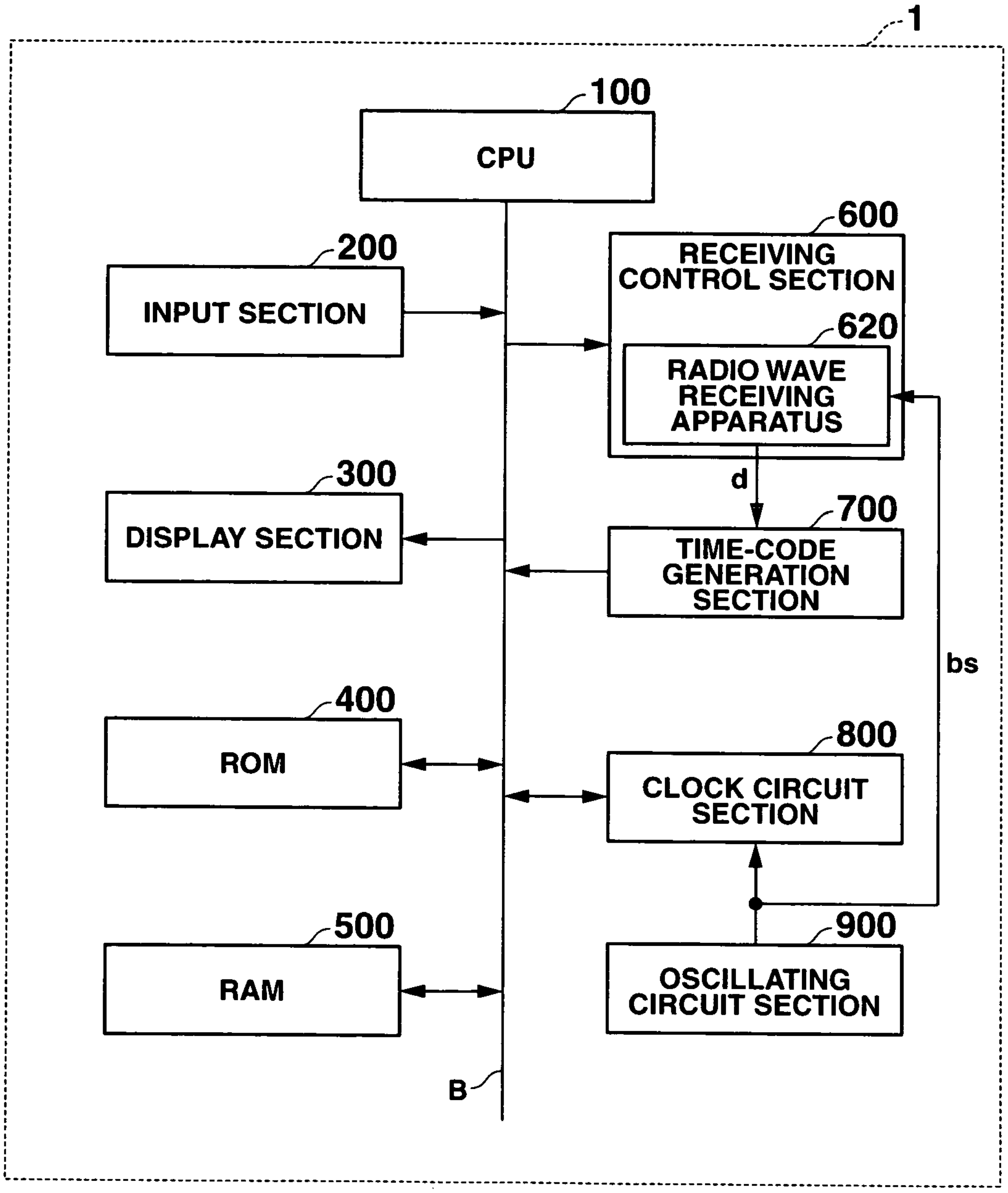
FIG. 1 is a block diagram of a radio wave timepiece of an embodiment in the present invention.

FIG. 1 is a block diagram illustrating a structure of the radio wave timepiece in the embodiment. According to the figure, a radio wave timepiece 1 includes a CPU (Central Processing Unit) 100, an input section 200, a display section 300, a ROM (Read Only Memory) 400, a RAM (Random Access Memory) 500, a receiving control section 600, a time-code generating section 700, a clock circuit section 800 and an oscillating circuit section 900. These sections excluding the oscillating circuit section 900 are connected to one another by a bus B. The oscillating circuit section 900 is connected to the radio wave receiving apparatus 620 and the clock circuit section 800.

The CPU 100, the ROM 400, the RAM 500, the receiving control section 600, the time-code generating section 700, the clock circuit section 800 and the oscillating circuit section 900 can be formed by using a semiconductor integrated circuit.

The CPU 100 reads out a program stored in the ROM 400 at a predetermined timing or according to an operational signal input from the input section 200, develops it on the RAM 500, and gives instructions to individual sections constituting a radio wave timepiece 1 or transfers data and the like on the basis of the program. Concretely, for example, the CPU 100 controls the receiving control section 600 every predetermined time to execute the receiving process of a standard radio wave, and to adjust the current time data to be measured by the clock circuit section 800 on the basis of a standard time code input from the time-code generating section 700.

The input section 200 is constituted with switches and the like for executing various functions of the radio wave timepiece 1, to output a corresponding operational signal to the CPU 100 when these switches are operated. The display section 300 is constituted with a small-sized liquid crystal display and the like, to display the current time and the like on the basis of display signals input from the CPU 100.

The ROM 400 stores system programs and application programs related to the radio wave timepiece 1 as well as programs realizing the present embodiment and data. The RAM 500 is used as a working area of the CPU 100, to temporarily store programs, data and the like read out from the ROM 400.

The receiving control section 600 is provided with a radio wave receiving apparatus 620. The radio wave receiving apparatus 620 removes unnecessary frequency components of low standard radio waves received from a receiving antenna, to take out a desired frequency signal and to convert into an electrical signal to output it to the time-code generating section 700.

The time-code generating section 700 converts the electrical signal input from the radio wave receiving apparatus 620 into a digital signal and generates standard time codes including data necessary for timepiece functions such as a standard current time code, accumulated number of days from January 1, a day code and the like to output them to the CPU 100.

The clock circuit section 800 counts signals input from the oscillating circuit section 900 to measure the current time, to output the current time data to the CPU 100. The oscillating circuit section 900 is constituted with a crystal oscillator and the like, to output the reference frequency signal of 32.768 kHz.

[Radio Wave Receiving Apparatus]

Figure 2:
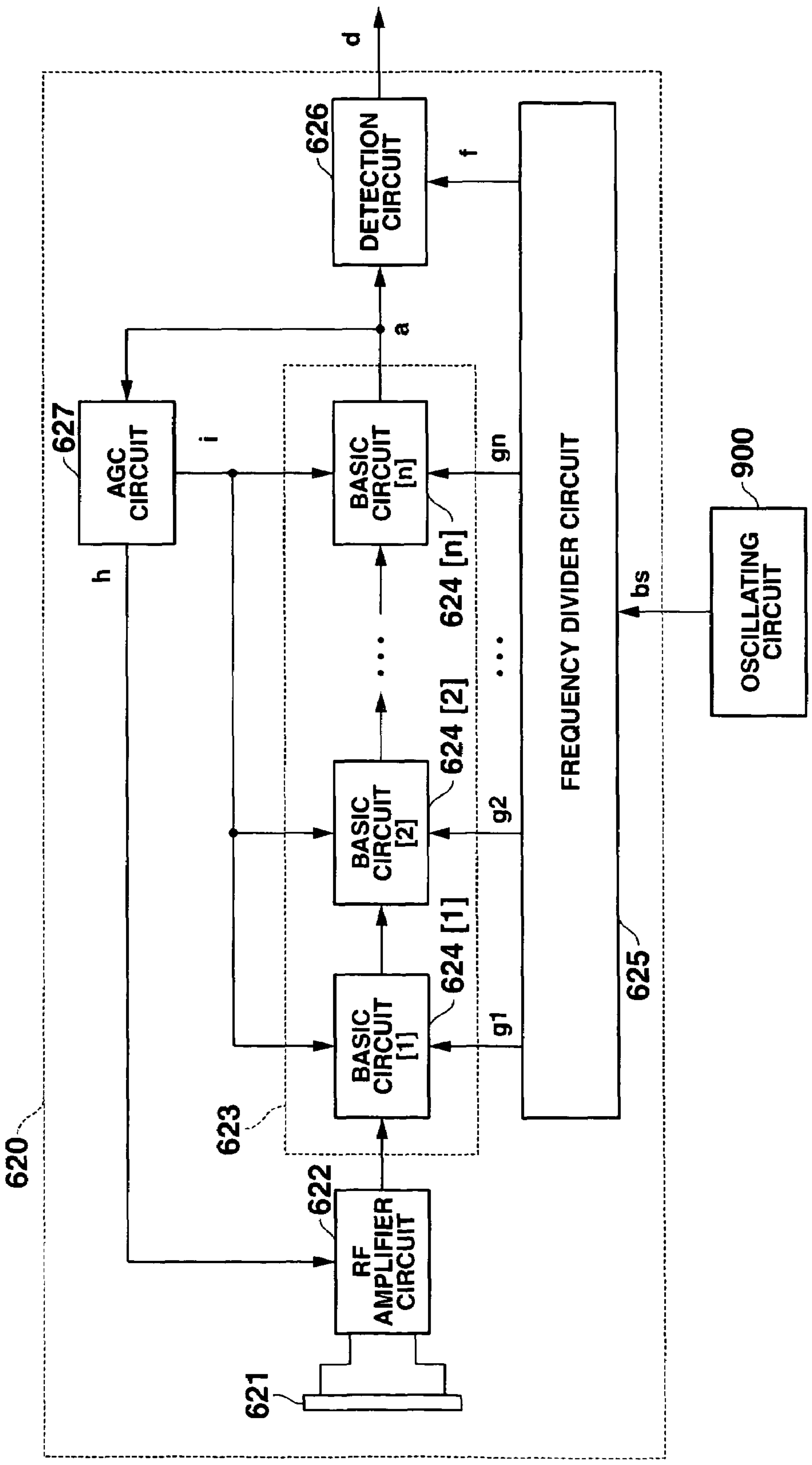
FIG. 2 is a block diagram of a radio wave receiving apparatus of the present invention.

FIG. 2 is a block diagram illustrating a conceptual constitution of the radio wave receiving apparatus 620 in the embodiment. According to the figure, the radio wave receiving apparatus 620 includes a receiving antenna 621, an RF amplifier circuit 622, a multi-stage frequency conversion circuit 623, a frequency divider circuit 625, a detection circuit 626 and an AGC circuit 627.

The receiving antenna 621 is constituted with, for example, a bar antenna, to receive a standard radio wave having a predetermined frequency including a current time code, and to convert the received standard radio wave into an electrical signal to output the signal. The RF amplifier circuit 622 amplifies or attenuates a signal input through the receiving antenna 621 according to a control signal "h" input from the AGC circuit 627, to output the signal.

The multi-stage frequency conversion circuit 623 has a plurality of basic circuits 624[1], 624[2] . . . , 624[N] made up of n stages connected in series (hereinafter, inclusively referred to as a basic circuit 624), to convert a signal input from the RF amplifier circuit 622 sequentially into a frequency based on such signals "g" as g1, g2, . . . gn, input from the frequency divider circuit 625 (hereinafter inclusively referred to as signal "g"), thereby to convert the signal into a lower frequency gradually to output it as signal "a".

Figure 3:
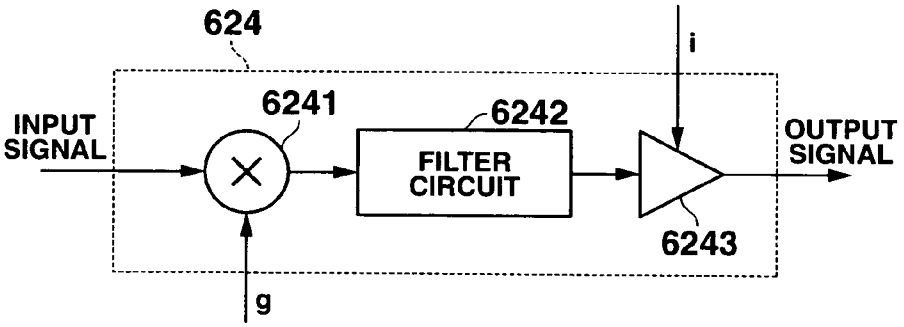
FIG. 3 is a block diagram of a basic circuit of the present invention.

FIG. 3 is a view illustrating a circuit configuration of a basic circuit 624. The basic circuit 624 is a circuit (conversion circuit) for multiplying and synthesizing an input signal with a signal "g" (frequency-divided signal) input from the frequency divider circuit 625 to conduct frequency conversion. As shown in the figure, the basic circuit is constituted with a mixer 6241, a filter circuit 6242 and an amplifier 6243.

The mixer 6241 multiplies and synthesizes an input signal to the basic circuit 624 with a signal "g" input from the frequency divider circuit 625, thereby to output the result.

The filter circuit 6242 is constituted with a LPF (low pass filter) and the like, to allow frequencies in a predetermined low range to pass through with respect to a signal input from the mixer 6241, however to cut off a frequency component outside the range. A pass band of the filter circuit 6242 is decided dependent on the frequency of an input signal and a signal "g" in the basic circuit 624. Concretely, the filter circuit 6242 is constituted in such a way that a sum frequency of the input signal and the signal "g" is cut off while a difference frequency is allowed to pass through.

The amplifier 6243 amplifies or attenuates a signal input from the filter circuit 6242 dependent on a control signal "i" input from the AGC circuit 627, to output the signal. The output of the amplifier 6243 is given as an output signal of the basic circuit 624.

The multi-stage frequency conversion circuit 623 comprises a plurality of such constituted basic circuits 624 connected serially in a multi-stage manner, and into each of the basic circuits 624, an output signal of the stage just before the each of the basic circuit 624 is input as an input signal. However, into the first stage of the basic circuit 624[1], an output signal from the RF amplifier circuit 622 is input as an input signal. Then, an output signal from the last stage of the basic circuit 624[N] is given as an output signal "a" from the multi-stage frequency conversion circuit 623.

In FIG. 2, the frequency divider circuit 625 frequency-divides or frequency-multiplies a reference frequency signal bs input from the oscillating circuit section 900 by a plurality of ratios, to output the results as signals g1, g2, . . . gn into the basic circuits 624[1], 624[2], . . . 624[N], and also to output them as a signal "f" into a detection circuit 626.

The detection circuit 626 detects a signal "a" input from the multi-stage frequency conversion circuit 623 by using the signal "f" input from the frequency divider circuit 625, and outputs it as a detected signal "d". The detected signal "d" is input into a time-code generating section 700 and is utilized to adjust the current time and the like.

The AGC circuit 627 generates and outputs a control signal "h" to control an amplified degree of the RF amplifier circuit 622 and a control signal "i" to control an amplified degree of the amplifier 6243 in each of the basic circuits 624, depending on the strength of a signal "a" input from the multi-stage frequency conversion circuit 623.

[Detection Circuit]

Figure 4:
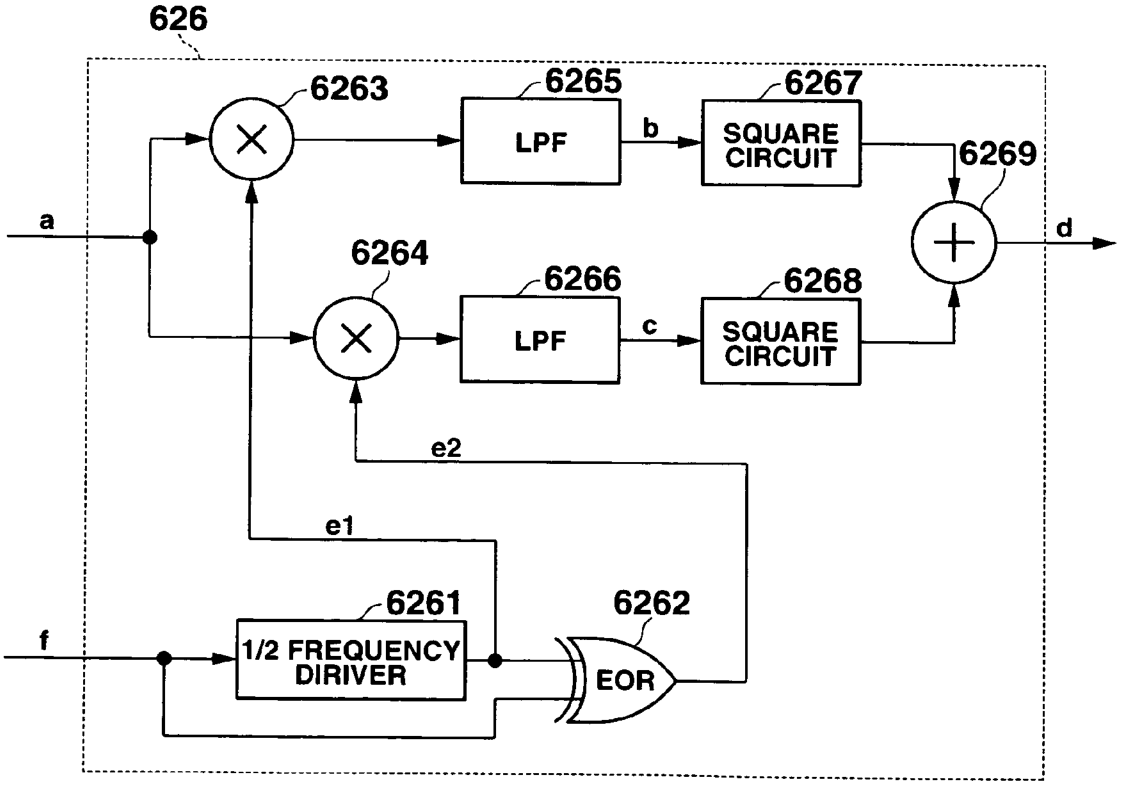
FIG. 4 is a block diagram of a detection circuit of the present invention.

FIG. 4 is a view illustrating a circuit configuration of the detection circuit 626. In this figure, the detection circuit 626 performs detection by referring to the signal "a" input from the multi-stage frequency conversion circuit 623. The detection circuit comprises a ½ frequency divider 6261, a logical gate 6262, mixers 6263 and 6264, LPFs 6265 and 6266, square circuits 6267 and 6268, and an adder 6269.

The ½ frequency divider 6261 frequency-divides the signal "f" input from the frequency divider circuit 625 into ½ and outputs it as a signal e1. Here, the frequency of the signal "f" which is input into the ½ frequency divider 6261 is set to be two times that of the signal "a", and therefore the signal e1 which is output from the ½ frequency divider 6261 is equal to the frequency of the signal "a".

The logical gate 6262 performs an exclusive OR (EOR) operation of the signal "f" with the signal e1 input from the ½ frequency divider 6261, to output the calculation result as a signal e2. Therefore, the signal e2 is a signal obtained by shifting the phase of the output signal e1 by 90 degrees (phase shift).

The mixer 6263 multiplies and synthesizes a signal "a" input from the multi-stage frequency conversion circuit 623 with a signal e1 input from the ½ frequency divider 6261, thereby to output the result. The LPF 6265 allows frequencies in a predetermined low range to pass through, with respect to a signal input from the mixer 6263, however to cut off a frequency component outside the range, and outputs a signal "b". The square circuit 6267 squares the signal "b" input from the LPF 6265 and outputs the result.

The mixer 6264 multiplies and synthesizes a signal "a" input from the multi-stage frequency conversion circuit 623 with a signal e2 input from the logical gate 6262 and outputs the result. The LPF 6266 allows frequencies in a predetermined low range to pass through, with respect to a signal input from the mixer 6264, however, cuts off a frequency component outside the range, thereby to output it as a signal "c". The square circuit 6268 squares the signal "c" input from the LPF 6266 and outputs the result.

The adder 6269 adds a signal input from the square circuit 6267 to a signal input from the square circuit 6268, to output the result as a detected signal d.

According to the detection circuit 626, a conversion signal whose frequency is decreased by the multi-stage frequency conversion circuit 623, a signal "f" input from the frequency divider circuit 625 and a signal obtained by performing a 90-degree phase shift to the signal "f" are multiplied and squared, and both signals are added to perform detection. Namely, a sum of squares of I and Q components of the conversion signal is calculated, thereby it enables to perform accurate detection even when a slight difference in frequency or phase between the conversion signal and a reference signal causes.

[Receiving Operation]

Next, a concrete signal-receiving operation in a radio wave receiving apparatus 620 will be explained.

(I) Reception of a Standard Radio Wave of 40 kHz (Japan):

In a case of receiving a standard radio wave of 40 kHz, a multi-stage frequency conversion circuit 623 is constituted with three stages of basic circuits, namely, 624[1], 624[2] and 624[3]. FIG. 5A to FIG. 5D and FIG. 6 are views illustrating an image of frequency spectrum for explaining a signal-receiving operation in this case.

Figure 5A:
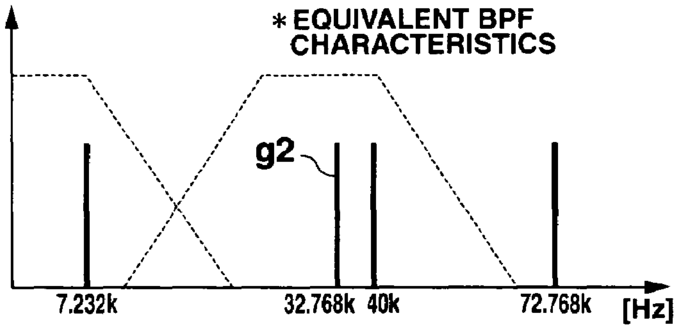
FIG. 5A to FIG. 5D are views illustrating an image of a frequency spectrum in explaining an operation of receiving the standard radio wave of 40 kHz in the present invention.

First, a received signal of 40 kHz from the RF amplifier circuit 622 and a signal g1 of 32.768 kHz which is a reference frequency signal bs output from the frequency divider circuit 625 are input into the first stage of the basic circuit 624[1] in the multi-stage frequency conversion circuit 623. Next, as illustrated in FIG. 5A, the mixer 6241 multiplies and synthesizes the received signal of 40 kHz with the signal g1 of 32.768 kHz to generate a signal of 72.768 kHz and a signal of 7.232 kHz, which are a sum of and a difference between these two frequencies, respectively.

Here, when a cut-off frequency of a filter circuit 6242 in the basic circuit 624[1] is about 8 kHz, in the generated signals by the mixer, a signal of 72.768 kHz is cut off by the filter circuit 6242, and a signal of 7.232 kHz passes through the filter circuit 6242 to output as an output signal of the basic circuit 624[1] via an amplifier 6243.

In other words, the basic circuit 624[1] is equivalent to a BPF (band pass filter) which includes 40 kHz of the input signal in a pass band. Further, a bandwidth of the equivalent BPF is dependent on the bandwidth of the filter circuit 6242.

Figure 5B:
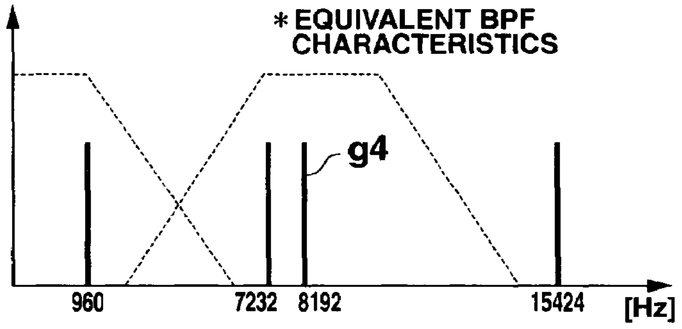

Into the next stage of the basic circuit 624[2], a signal of 7232 Hz output from the basic circuit 624[1] being the previous stage and a signal g2 of 8192 Hz output from the frequency divider circuit 625, obtained by frequency-dividing by 4 the signal of 32768 Hz which is a reference frequency signal bs are input. As illustrated in FIG. 5B, the input signal of 7232 Hz and the signal g2 of 8192 Hz are multiplied and synthesized to generate a signal of 15424 Hz and a signal of 960 Hz, which are a sum of and a difference between these two frequencies, respectively.

Here, when a cut-off frequency of a filter circuit 6242 in the basic circuit 624[2] is about 1 kHz, in the generated signals by the mixer, a signal of 15424 Hz is cut off by the filter circuit 6242, and a signal of 960 Hz passes through the filter circuit 6242 to output as an output signal of the basic circuit 624[2] via an amplifier 6243.

In other words, the basic circuit 624[2] is equivalent to a BPF which includes 3272 Hz of the input signal in a pass band. Further, the pass band of the equivalent BPF is dependent on the pass band of the filter circuit 6242. However, since the pass band of the filter circuit 6242 in the basic circuit 624[2] is narrower than that of the filter circuit 6242 in the basic circuit 624[1], the pass band of the equivalent BPF in the basic circuit 624[2] is narrower than that of the equivalent BPF in the basic circuit 624[1].

Figure 5C:
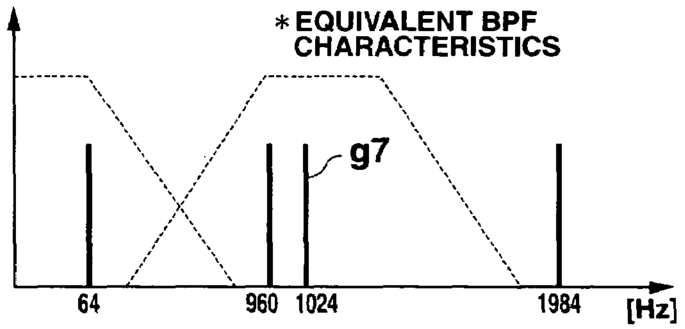

Into the final stage of the basic circuit 624[3], a signal of 960 Hz output from the basic circuit 624[2] being the previous stage and a signal g7 of 1024 Hz output from the frequency divider circuit 625, obtained by frequency-dividing by 32 the signal of 32768 Hz which is a reference frequency signal bs are input. As illustrated in FIG. 5C, the input signal of 960 Hz and the signal g7 of 1024 Hz are multiplied and synthesized to generate a signal of 1984 Hz and a signal of 64 Hz, which are a sum of and a difference between these two frequencies, respectively.

Here, when a cut-off frequency of the filter circuit 6242 in the basic circuit 624[3] is about 70 Hz, in the generated signals by the mixer, a signal of 1984 Hz is cut off by the filter circuit 6242, and a signal of 64 Hz passes through the filter circuit 6242 to output as an output signal of the basic circuit 624[3]. The output signal is input into the detection circuit 626 as the output signal of the multi-stage frequency conversion circuit 623.

In other words, the basic circuit 624[3] is equivalent to a BPF which includes 1024 Hz of the input signal in a pass band. Further, the pass band of the equivalent BPF is dependent on the pass band of the filter circuit 6242. However, since the pass band of the filter circuit 6242 in the basic circuit 624[3] is narrower than that of the filter circuit 6242 in the basic circuit 624[2], the pass band of the equivalent BPF in the basic circuit 624[3] is narrower than that of the equivalent BPF in the basic circuit 624[2].

Figure 5D:
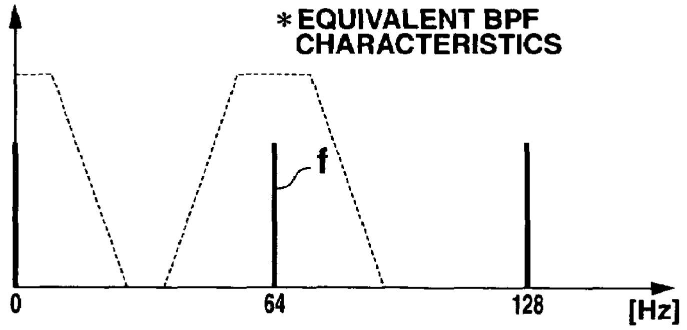

Then, into the detection circuit 626, the signal "a" of 64 Hz output from the multi-stage frequency conversion circuit 623 and the signal g11 of 128 Hz output from the frequency divider circuit 625, obtained by frequency-dividing by 256 the signal of 32768 Hz which is the reference frequency signal bs, are input and detected. That is, as illustrated in FIG. 5D, the mixers 6263 and 6264 multiply and synthesize the input signal "a" of 64 Hz and signals e1 of 64 Hz, and the input signal "a" and e2 of 64 Hz which is different from e1 in phase by 90 degrees, respectively, to generate a signal of 128 Hz and a signal of 0 Hz, which are a sum of and a difference between these two frequencies, respectively.

Here, when a cut-off frequency of each of the LPFs 6265 and 6266 is about 5 Hz, in the generated signals by the mixers, a signal of 128 Hz is cut off by the LPFs 6265 and 6266, and a signal of 0 Hz passes through the filter circuit 6242 to output as an output signal of the LPFs 6265 and 6266. The output signals are squared by square circuits 6267 and 6268, and further added to output as a detected signal "d".

In other words, the detection circuit 626 is equivalent to a BPF which includes 64 Hz in a pass band. Further, the pass band of the equivalent BPF is dependent on the pass band of the filter circuit 6242. However, since the pass band of the LPFs 6265 and 6266 is narrower than that of the filter circuit 6242 in the basic circuit 624[3], the pass band of each LPF is narrower than that of the equivalent BPF in the basic circuit 624[3].

Figure 6:
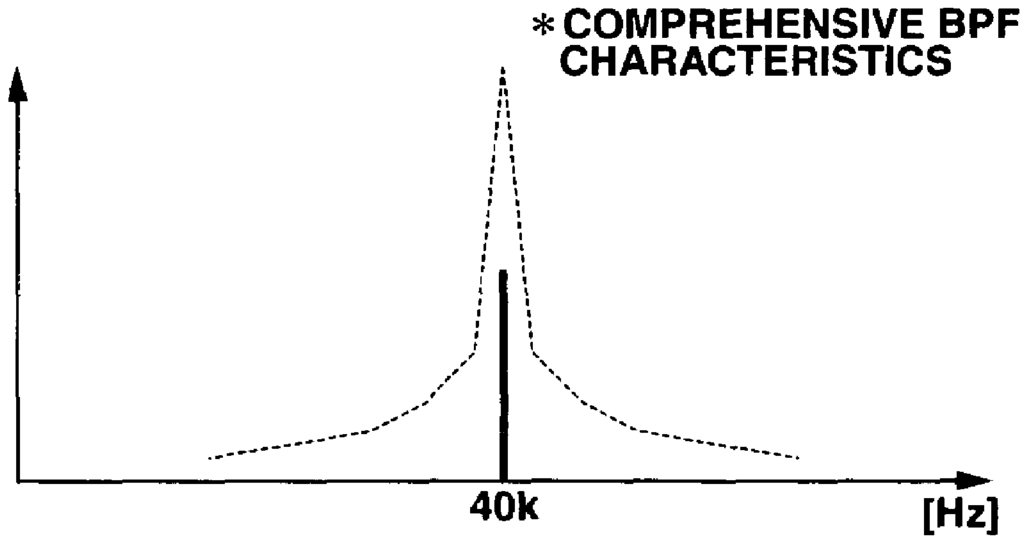
FIG. 6 is a view illustrating a case where an operation of receiving the standard radio wave of 40 kHz is regarded as an extremely narrow band of a BPF (band pass filter) in the present invention.

Therefore, the radio wave receiving apparatus 620 is, as a whole, equivalent to four stages of BPF connected in series. As illustrated in FIG. 6, it can be regarded as a BPF having an extremely narrow band centered on 40 kHz, which is a reception frequency. FIG. 6 is a view on an assumption that an operation of receiving standard radio waves given in FIG. 5A to FIG. 5D is regarded as a BPF having an extremely narrow band or as a comprehensive BPF.

In the multi-stage frequency conversion circuit 623, an input signal output from the basic circuit 624 of the stage just before each of the basic circuits 624 is multiplied and synthesized with signals "g" (g2, g4 and g7) to decrease the frequency, so that the frequency of the received signal input from the RF amplifier circuit 622 is gradually decreased. That is, since the pass bands of the equivalent BPF of the basic circuits 624 are gradually narrower, the radio wave receiving apparatus 620 in its entirety can be regarded as a BPF having an extremely narrow band centered on the frequency of the received signal.

Although an ideal signal-receiving operation in the radio wave receiving apparatus 620 is described above, the signal "a" input into the detection circuit 626 is actually not in perfect coincident with the signal "f" in frequency and phase, and thereby results in a possible deformation of the waveform of a detected signal "d". In the embodiment, however, the sum of squares of I and Q components of the signal "a" is calculated at the detection circuit 626, thereby to make it possible to prevent the deformation of a waveform of the detected signal "d" resulting from the deviation and to perform accurate detection.

Next, a concrete explanation thereof will be made.

In FIG. 4, when a signal "a" which is input into the detection circuit 626, is expressed by a=A sin ωt, a signal e1 output from the ½ frequency divider 6261 has the same frequency as that of the signal "a" and is therefore expressed to be e1=sin (ωt+ϕ(t)). Here, ϕ(t) is a phase lag (difference) from the signal "a". Therefore, an output signal of the mixer 6263 is expressed by the following equation (1).

$$a\cdot e1 = A\sin\varpi t\cdot\sin(\varpi t+\phi(t)) = \frac{A}{2}\{\cos\phi(t)-\cos 2\varpi t\cdot\cos\phi(t)+\sin 2\varpi t\cdot\cos\phi(t)\} \quad (1)$$

When the signal passes through the LPF 6265, high-frequency components are cut off, and the signal "b" output from the LPF 6265 is expressed by b=A/2·cos ϕ(t) The signal e2 is a signal obtained by shifting the phase of the signal e1 by 90 degrees, and expressed by e2=cos (ωt+ϕ(t)). Therefore, an output signal of the mixer 6264 is expressed by the following equation (2).

$$a\cdot e2 = A\sin\varpi t\cdot\cos(\varpi t+\phi(t)) = \frac{A}{2}\{\sin 2\varpi t\cdot\cos\phi(t)-\sin\phi(t)+\cos 2\varpi t\cdot\sin\phi(t)\} \quad (2)$$

When the signal passes through the LPF 6266, high-frequency components are cut off, and the signal "c" output from the LPF 6266 is expressed by c=−A/2·sin ϕ(t).

Then, signals b and c are squared by the square circuits 6267 and 6268, respectively, and added by an adder 6269 to output a detection signal "d" from the detection circuit 626. The detection signal "d" is expressed by the following equation (3).

$$d = \left\{\frac{A}{2}\cos\phi(t)\right\}^2+\left\{-\frac{A}{2}\sin\phi(t)\right\}^2 = \frac{A^2}{4}\{\cos^2\phi(t)+\sin^2\phi(t)\} = \frac{A^2}{4} \quad (3)$$

(II) Reception of a Standard Radio Wave of 77.5 kHz (Germany)

In a case of receiving a standard radio wave of 77.5 kHz, the multi-stage frequency conversion circuit 623 is constituted with five stages of basic circuits, namely, 624[1], 624[2] . . . 624[5]. FIG. 7A to FIG. 7D, FIG. 8A to FIG. 8B and FIG. 9 are views illustrating images of frequency spectrum for explaining a signal-receiving operation in this case.

Figure 7A:
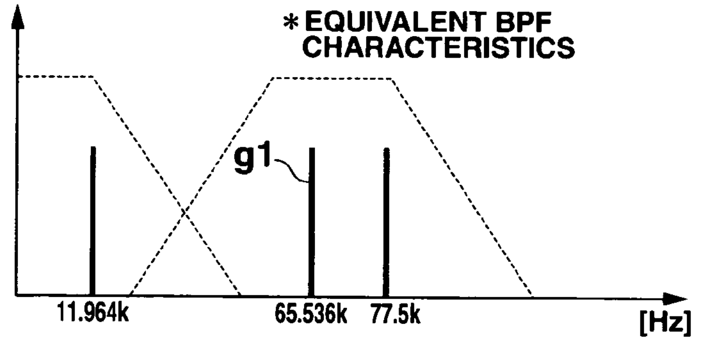
FIG. 7A to FIG. 7D are views illustrating an image of a frequency spectrum in explaining an operation of receiving the standard radio wave of 77.5 kHz in the present invention.

First, a received signal of 77.5 kHz from the RF amplifier circuit 622 and a signal g1 of 65.536 kHz obtained by multiplying by 2 a signal of 32.768 kHz which is a reference frequency signal bs output from the frequency divider circuit 625 are input into the first stage of the basic circuit 624[1]. Next, as illustrated in FIG. 7A, the mixer 6241 multiplies and synthesizes the received signal of 77.5 kHz with the signal g1 of 65.536 kHz, to output a signal of 11.964 kHz which is the difference between these two frequencies, as an output signal of the basic circuit 624[1], after passing through the filter circuit 6242. In this case, the basic circuit 624[1] can be regarded to be equivalent to a BPF which includes 77.5 kHz of the input signal in a pass band.

Figure 7B:
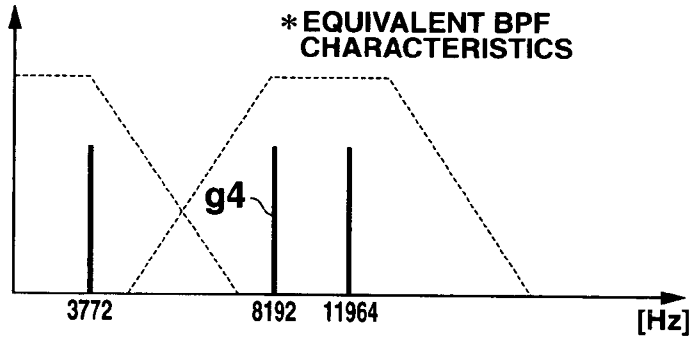

Into the next stage of the basic circuit 624[2], a signal of 11964 Hz output from the basic circuit 624[1] being the previous stage and a signal g4 of 8192 Hz output from the frequency divider circuit 625, obtained by frequency-dividing by 4 the signal of 32768 Hz which is a reference frequency signal bs are input. As illustrated in FIG. 7B, the input signal of 11964 Hz and the signal g4 of 8192 Hz are multiplied and synthesized and a signal of 3772 Hz which are a difference between these two frequencies passes through the filter circuit 6242 to output as the output signal of the basic circuit 624[2]. In this case, the basic circuit 624[2] can be regarded to be equivalent to a BPF which includes 8192 Hz of the input signal in a pass band. The pass band of the equivalent BPF is narrower than that of the equivalent BPF in the basic circuit 624[1].

Figure 7C:
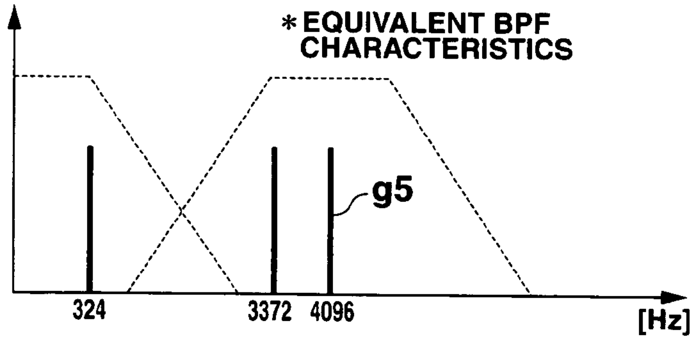

Into the next stage of the basic circuit 624[3], a signal of 3772 Hz output from the basic circuit 624[2] being the previous stage and a signal g5 of 8192 Hz output from the frequency divider circuit 625, obtained by frequency-dividing by 8 the signal of 32768 Hz which is a reference frequency signal bs are input. As illustrated in FIG. 7C, the input signal of 3372 Hz and the signal g4 of 4096 Hz are multiplied and synthesized to generate a signal of 324 Hz which is the difference between these two frequencies. The signal of 324 Hz passes through the filter circuit 6242 and outputs as the output signal of the basic circuit 624[3]. In this case, the basic circuit 624[3] can be regarded to be equivalent to a BPF which includes 3372 Hz of the input signal in a pass band. The pass band of the equivalent BPF is narrower than that of the equivalent BPF in the basic circuit 624[2].

Figure 7D:
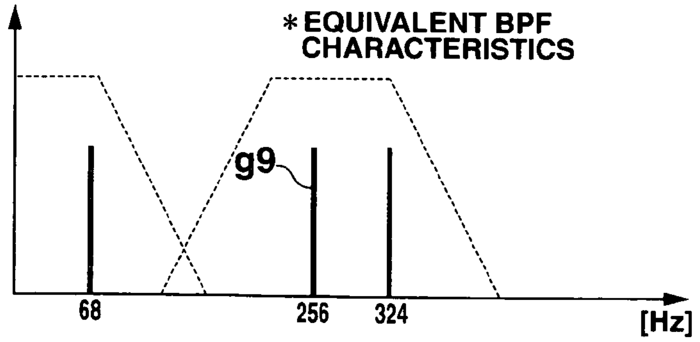

Into the next stage of the basic circuit 624[4], a signal of 324 Hz output from the basic circuit 624[3] being the previous stage and a signal "g9" of 256 Hz output from the frequency divider circuit 625, obtained by frequency-dividing by 128 the signal of 32768 Hz which is a reference frequency signal are input. As illustrated in FIG. 7D, the signal of 324 Hz and the signal g4 of 256 Hz are multiplied and synthesized to generate a signal of 68 Hz which is the difference between these two frequencies. The signal of 68 Hz passes through the filter circuit 6242 and outputs as the output signal of the basic circuit 624[4]. In this case, the basic circuit 624[4] can be regarded to be equivalent to a BPF which includes 324 Hz of the input signal in a pass band. The pass band of the equivalent BPF is narrower than that of the equivalent BPF in the basic circuit 624[3].

Figure 8A:
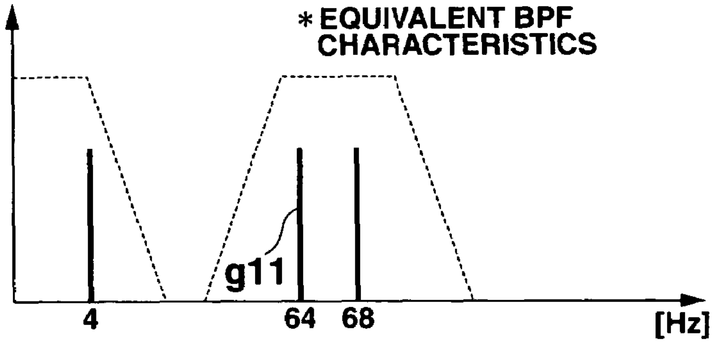
FIG. 8A to FIG. 8B are views illustrating an image of a frequency spectrum in explaining an operation of receiving the standard radio wave of 77.5 kHz in the present invention.

Into the final stage of the basic circuit 624[5], a signal of 68 Hz output from the basic circuit 624[4] being the previous stage and a signal g11 of 64 Hz output from the frequency divider circuit 625, obtained by frequency-dividing by 512 the signal of 32768 Hz which is a reference frequency signal are input. As illustrated in FIG. 8A, the signal of 68 Hz and the signal g11 of 64 Hz are multiplied and synthesized to generate a signal of 4 Hz which is the difference between these two frequencies. The signal of 4 Hz passes through the filter circuit 6242 and outputs as the output signal of the basic circuit 624[5]. This output signal is also the output signal of the multi-stage frequency conversion circuit 623. In this case, the basic circuit 624[5] can be regarded to be equivalent to a BPF which includes 68 Hz of the input signal in a pass band.

The pass band of the equivalent BPF is narrower than that of the equivalent BPF in the basic circuit 624[3].

Figure 8B:
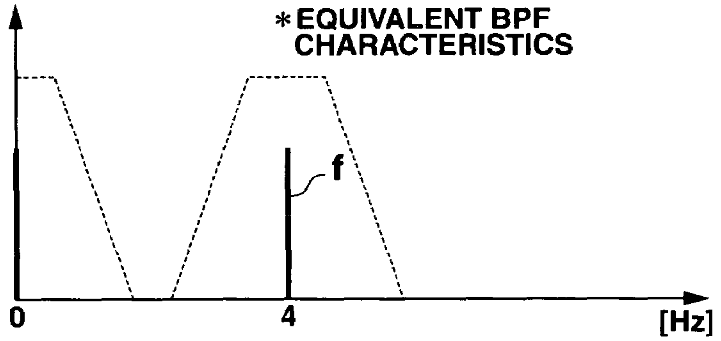

Then, into the detection circuit 626, the signal "a" of 4 Hz output from the multi-stage frequency conversion circuit 623 and the signal g15 as a signal "f", of 4 Hz output from the frequency divider circuit 625, obtained by frequency-dividing by 8182 the signal of 32768 Hz which is the reference frequency signal bs, are input and detected. That is, as illustrated in FIG. 8B, the input signal "a" of 4 Hz and the signal "f" of 4 Hz are multiplied and synthesized to generate a signal of 0 Hz which a difference between these two frequencies. The generated signal is output as a detection signal "d" output from the detection circuit 626. In this case, the detection circuit 626 can be regarded to be equivalent to a BPF which includes 4 Hz of the input signal in a pass band. The pass band of the equivalent BPF is narrower than that of the equivalent BPF in the basic circuit 624[5].

Figure 9:
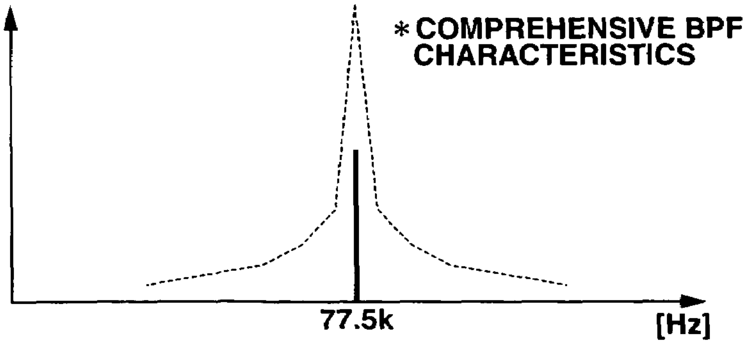
FIG. 9 is a view illustrating a case where an operation of receiving the standard radio wave of 77.5 kHz is regarded as an extremely narrow band of a BPF in the present invention.

Therefore, the radio wave receiving apparatus 620 is, as a whole, equivalent to 6 stages of BPF connected in series. As illustrated in FIG. 9, it can be regarded as a BPF having an extremely narrow band centered on 77.5 kHz, which is a reception frequency. FIG. 9 is a view on an assumption that an operation of receiving standard radio waves given in FIG. 7A to FIG. 7D and FIG. 8A to FIG. 8B is regarded as a BPF having an extremely narrow band or as a comprehensive BPF.

Additionally, since the signal "a" output from the last stage of the basic circuit 624[5] has a low frequency of 4 Hz, the multi-stage frequency conversion circuit 623 may be constituted with four stages of basic circuits 624[1], 624[2], . . . and 624[4]. In this case, a signal "a" of 68 Hz from the multi-stage frequency conversion circuit 623 and a signal "f" of 64 Hz from the frequency divider circuit 625 are respectively input into the detection circuit 626 to perform detection. Then, although a detected signal "d" of 4 Hz which is a difference between these two frequencies, is output, since the detection circuit 626 is used to detect only amplitude components of signals, there are no problem for detection, namely, for reproduction of received signals.

FIG. 10 is a table showing frequencies of signals "g" input from the frequency divider circuit 625 into each of the basic circuits 624 in the multi-stage frequency conversion circuit 623 and frequencies of output signals of the basic circuit 624 when receiving standard radio waves different in frequency in various countries. This figure shows the following cases, 1) Japan (40 kHz), 2) Japan (60 kHz), 3) Germany (77.5 kHz), 4) Switzerland (70 kHz) and 5) China (68.5 kHz).

For example, in the case of 2) Japan (60 kHz), the multi-stage frequency conversion circuit 623 is constituted with five stages of basic circuits, namely, 624[1], 624[2], . . . , 624[5]. In the first stage of the basic circuit 624[1], a received signal of 60 kHz and a signal g1 of 65.536 kHz are multiplied and synthesized, and converted into a signal of 5536 Hz which is a difference frequency therebetween. Then, in the basic circuit 624[2], the signal of 5536 Hz and a signal g4 of 8192 Hz are multiplied and synthesized, and converted into a signal of 2656 Hz. In the next stage of the basic circuit 624[3], the signal of 2656 Hz and a signal "g6" of 2048 Hz are multiplied and synthesized, and converted into a signal of 608 Hz. Subsequently, in the basic circuit 624[4], the signal of 608 Hz and a signal "g8" of 512 Hz are multiplied and synthesized, and converted into a signal of 96 Hz, in the basic circuit 624[5], the signal of 96 Hz and a signal "g10" of 128 Hz are multiplied and synthesized, and converted into a signal of 32 Hz. Then, the signal of 32 Hz and a signal "g12" of 32 Hz as a signal "f" are input into the detection circuit 626 to perform detection.

As described above, n-stages of basic circuits 624 connected in series in the multi-stage frequency conversion circuit 623 convert standard radio waves received from the receiving antenna 621 into lower frequencies sequentially on the basis of signals "g" input from the frequency divider circuit 625. Then, signals output from the multi-stage frequency conversion circuit 623 are detected by the detection circuit 626.

According to the embodiment of the invention, local oscillating circuits or PLL circuits which were required in a conventional super-heterodyne system of radio wave receiving apparatus are not necessary. Therefore, it is possible to receive signals in a stable manner and to reduce electric power consumption for a whole apparatus. Further, because the process in which frequencies of received signals are converted into frequencies based on a frequency-divided signal is conducted by a plurality of conversion circuits, it is possible to receive signals with a high accuracy. In addition, since each of conversion circuits for converting frequencies are constituted with simple circuit elements, a reduction in chip size is attained according to a large-scale integration by using CMOS.

Next, embodiments of the radio wave receiving apparatus 620 according to the invention will be explained concretely.

Embodiment 1

First, Embodiment 1 will be explained as follows.

As described above, a multi-stage frequency conversion circuit 623 is constituted with a plurality of basic circuits 624 connected in series. Each of the basic circuits 624 is different from one another in pass band set in a filter circuit 6242, depending on a frequency of a standard radio wave to be received and a stage at which the basic circuit 624 is arranged in the multi-stage frequency conversion circuit 623. Therefore, in Embodiment 1, the individual basic circuits 624 are constituted as follows.

Figure 11A:
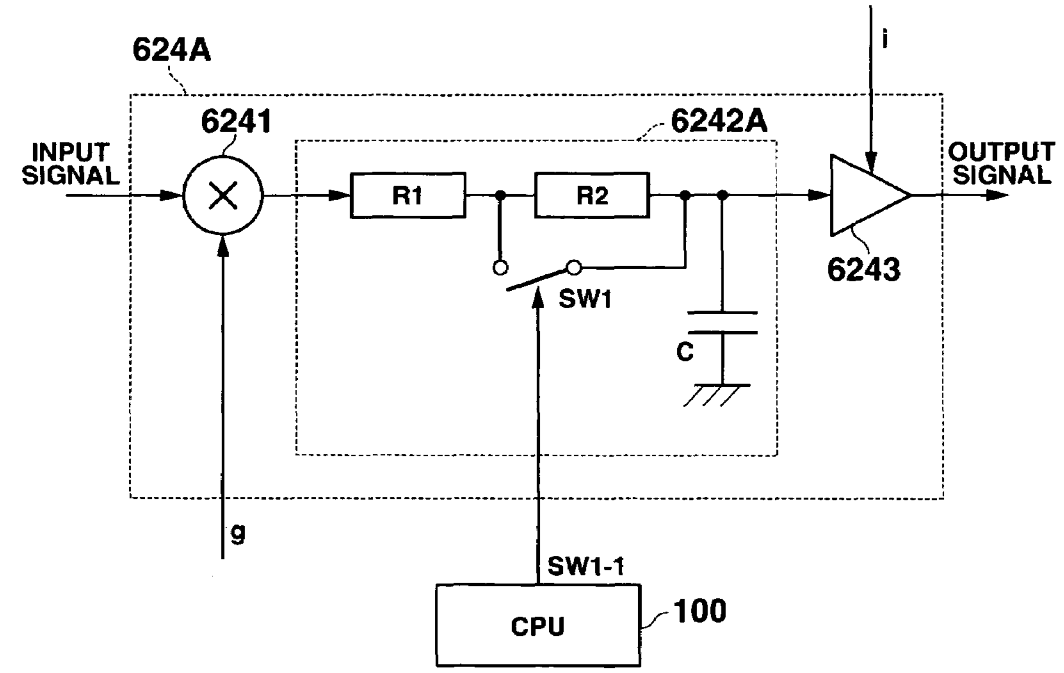
FIG. 11A is a block diagram of a basic circuit of Embodiment 1 in the present invention.

FIG. 11A is a view illustrating a circuit configuration of the basic circuit 624A in Embodiment 1. In the figure, the basic circuit 624A includes a mixer 6241, a filter circuit 6242A and an amplifier 6243. The filter circuit 6242A is provided with registers R1 and R2 connected in series, a capacitor C and a switch SW1 connected to the register R2 in parallel. The switch SW1 is operated by an input from a CPU 100, for example. ON/OFF (connection/disconnection) is controlled by a bandwidth switching signal SW1-1 for instructing to switch a pass band of the filter circuit 6242A.

In the basic circuit 624A, when the switch SW1 is ON, a signal input from the mixer 6241 to the filter circuit 6242A passes through the register R1 and the switch SW1 to output, while the filter circuit 6242A functions as an RC filter having the register R1 and the capacitor C. In contrast, when the switch SW1 is OFF, a signal input into the filter circuit 6242A passes through the registers R1 and R2, and is output, while the filter circuit 6242A functions as an RC filter having the registers R1, R2 and the capacitor C. More specifically, the switch SW1 is turned ON/OFF by a bandwidth switching signal to be input, and thereby a time constant of the filter circuit 6242A is changed, or a pass band is switched.

Here, the filter circuit 6242A may be set for a pass band so as to cut off a sum frequency of an input signal to the basic circuit 624 and a signal "g" and also allow a difference frequency to pass through. Therefore, it is possible to realize a radio wave receiving apparatus 620 which enables conversion to a larger scale integration easily and general use, by providing the multi-stage frequency conversion circuit 623 which has a plurality of basic circuits 624A with the same constitution, connected in series, and in which for example, a bandwidth switching signal input from the CPU 100 is used for setting a pass band of each of the basic circuits 624.

Figure 11B:
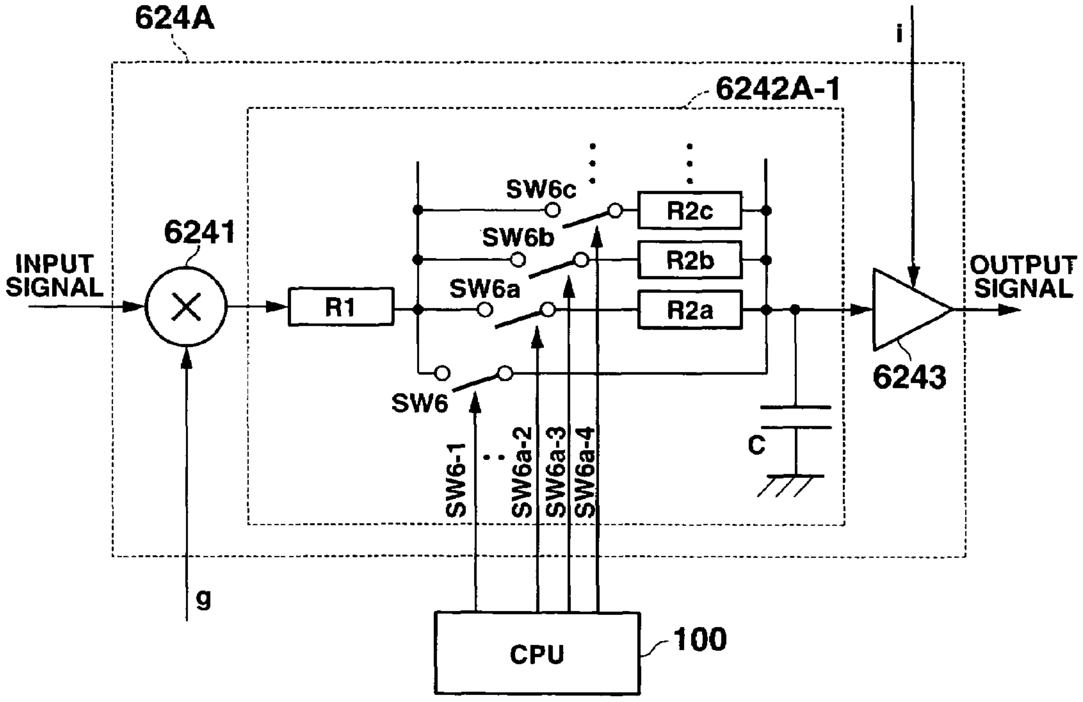
FIG. 11B is a block diagram of another basic circuit of Embodiment 1 in the present invention.

Additionally, the filter circuit 6242A may be constituted with three or more registers R, in place of the registers R1 and R2. FIG. 11B is a view illustrating an example of a circuit configuration of the basic circuit 624A-1 having 3 or more registers R. According to FIG. 11B, in the basic circuit 624A-1, the filter circuit 6242A-1 is constituted with a register R1, registers R2*a*, R2*b*, R2*c* . . . connected in parallel, a capacitor C, a switch SW6 connected in parallel to the registers R2*a*, R2*b*, R2*c*, . . . and switches SW6*a*, SW6*b*, SW6*c*, . . . connected to the registers R2*a*, R2*b*, R2*c* . . . in series, respectively. These switches SW6, SW6*a*, SW6*b*, SW6*c*, . . . are controlled for ON/OFF by switching control signals (SW6-1, SW6*a*-2, SW6*b*-3, SW6*c*-4, . . . ) input from the CPU 100, for example. Thereby, it is possible to set a pass band of the filter circuit 6242A-1 so as to be switched to 3 or more stages.

According to an invention of Embodiment 1, filters equipped in the basic circuits connected in series are allowed to be alternatively switched to a pass band among a plurality of predetermined pass bands. Therefore, these basic circuits can be constituted to have the same structure, for example, a pass band is switched depending on a frequency of a received signal and the stage at which the basic circuit is arranged in the multi-stage frequency conversion circuit, thereby to make it possible to provide an apparatus with a general-purpose constitution.

Embodiment 2

Next, Embodiment 2 will be explained as follows.

Embodiment 2 is one of a so-called multiband apparatus in which a radio wave receiving apparatus 620 is capable of receiving a plurality of different frequencies of standard radio waves.

Figure 12:
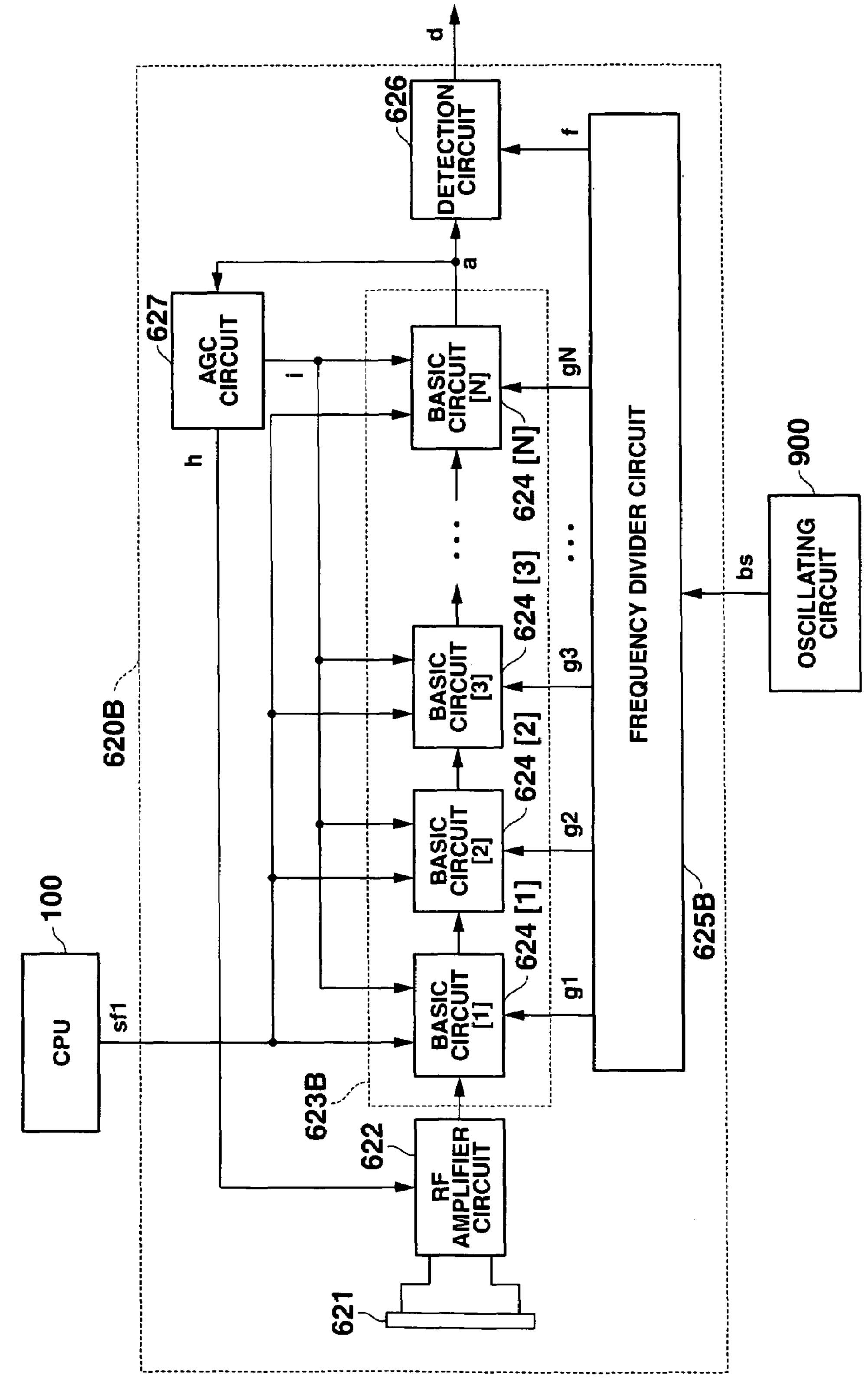
FIG. 12 is a block diagram of a radio wave receiving apparatus of Embodiment 2 in the present invention.

FIG. 12 is a block diagram illustrating a constitution of the radio wave receiving apparatus 620B according to Embodiment 2. In this figure, the radio wave receiving apparatus 620B includes a receiving antenna 621, an RF amplifier circuit 622, a multi-stage frequency conversion circuit 623B, a frequency divider circuit 625B, a detection circuit 626 and an AGC circuit 627.

Here, an explanation will be omitted for a block of functions and constitutions which is similar to that explained in FIG. 2.

The multi-stage frequency conversion circuit 623B is constituted with N-stages of a plurality of basic circuits 624[1], 624[2], . . . 624[N]. Then, signals g1, g2, . . . "gN" from the frequency divider circuit 625B are input into the basic circuits 624[1], 624[2], . . . , 624[N], respectively, and for example, a use/non-use switching signal sf is input from the CPU 100.

The frequency divider circuit 625B outputs signals g1, "g2", . . . , "gN" obtained by dividing a reference frequency signal bs input from a transmitting circuit section 900 by the respective frequency dividing ratios, 2, 1, ½, ¼, . . . , $½^{(N-2)}$ (N is an integral number) and a signal "f". Additionally, the frequency divider circuit 625B performs frequency-dividing after the reference frequency signal bs is multiplied by 2. However, for simplifying the explanation, an explanation will be made on the assumption that basic frequencies are to be divided.

Here, the number of stages N on the multi-stage frequency conversion circuit 623B is dependent on a frequency of the reference frequency signal bs. Namely, for example, when the reference frequency signal bs is a signal of 32.768 kHz, the multi-stage frequency conversion circuit 623B is constituted with serially-connected 16 stages of the basic circuits 624[1], 624[2], . . . , 624[16]. Then, as illustrated in the table given in FIG. 10, signals g1, g2, . . . , "g16" having 65768, 32768, 16384, 8192, . . . , 4 and 2 Hz, obtained by frequency-dividing the signal of 32768 Hz by the respective frequency dividing ratios of 2, 1, ½, ¼, . . . , 1/8182 and 1/16384, respectively, is output from a frequency divider circuit 625. These signals g1, g2, . . . , "g16" are input into basic circuits 624[1], 624[2], . . . , 624[16], respectively.

The use/non-use switching signal sf means a signal for specifying the use/non-use of individual basic circuits 624[1], 624[2], . . . , 624[N]. "To use" the basic circuits 624[1], 624[2], . . . , 624[N] means that in the basic circuit 624 concerned, synthesis is made by multiplying a signal "g" input from the frequency divider circuit 624 by an input signal from the previous stage to decrease the frequency, namely, to perform frequency conversion, while "not to use" the basic circuits (non-use) means that an input signal is output with no frequency conversion performed in the input signal. Whether individual basic circuits 624[1], 624[2], . . . , 624[N] which constitute the multi-stage frequency conversion circuit 623B are used or not is dependent on the frequency of a standard radio wave to be received.

For example, (A) when a standard radio wave of 40 kHz is received, as explained by referring to FIG. 5A to FIG. 5D and FIG. 6, the basic circuit 624[1] into which a signal g2 of 32768 Hz (being a reference frequency signal bs) is input, the basic circuit 624[2] into which a signal g4 of 8192 Hz obtained by frequency-dividing by 4 is input, and the basic circuit 624[3] into which a signal g7 of 1024 Hz obtained by frequency-dividing by 32 is input, are "used". On the contrary, basic circuits 624[4], 624[5], . . . , 624[N] other than the above-described three basic circuits are "not used."

(B) When a standard radio wave of 77.5 kHz is received, as explained by referring to FIG. 7A to FIG. 7D, FIG. 8A to FIG. 8B and FIG. 9, five basic circuits 624, into which a signal g1 of 65536 Hz obtained by multiplying a reference frequency signal bs by 2 is input, a signal g4 of 8192 Hz obtained by frequency-dividing the signal by 4 is input, a signal g5 of 4096 Hz obtained by frequency-dividing the signal by 8 is input, a signal "g9" of 256 Hz obtained by frequency-dividing the signal by 128 is input, and a signal g11 of 64 Hz by frequency-dividing the signal by 512 is input; are "used". On the contrary, the basic circuits 624 other than the five above-described basic circuits are "not used."

Figures 13A, 13B:
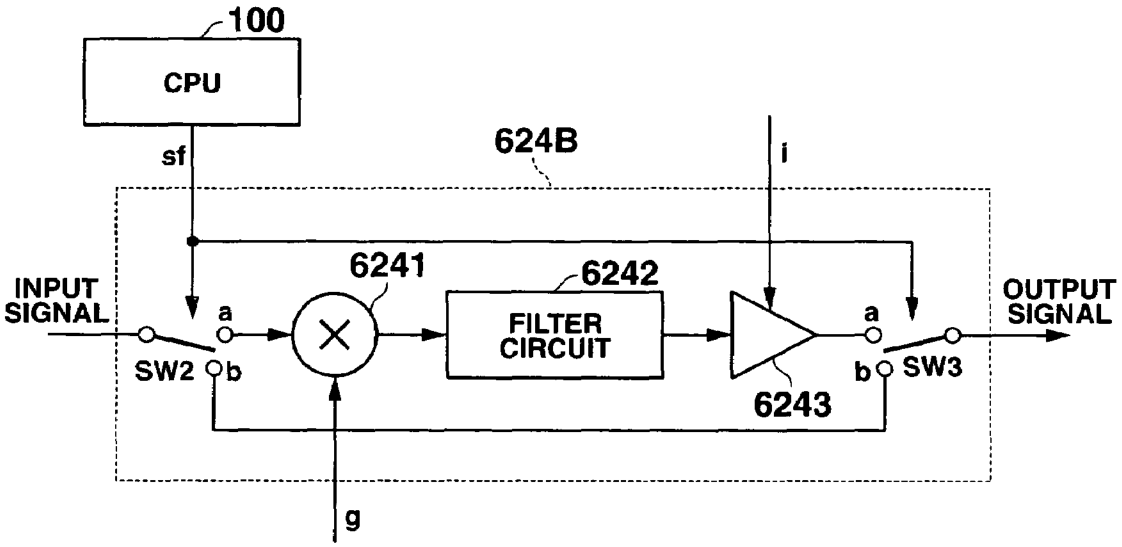
FIG. 13A is a block diagram of a basic circuit of Embodiment 2 in the present invention.
FIG. 13B is a table showing the relationship between the use/non-use of a basic circuit 624B given in FIG. 13A and the connected state of switches SW2 and SW3.

FIG. 13A is a view illustrating a basic circuit 624B, which is one circuit configuration, among basic circuits 624[1], 624[2], . . . , 624[N] constituting the multi-stage frequency conversion circuit 623B in Embodiment 2. According to FIG. 13A, the basic circuit 624B is constituted with switches SW2, SW3, a mixer 6241, a filter circuit 6242 and an amplifier 6243.

The switch SW2 is provided at the previous stage of the mixer 6241 and connected to either of terminals a or b, depending on a use/non-use switching control signal sf input from a CPU 100. The switch SW3 is provided at the subsequent stage of the amplifier 6243, and connected to either of the terminals "a" or "b", depending on the use/non-use switching control signal sf to be input.

FIG. 13B is a table illustrating the relationship between the use/non-use switching signal sf and the connection state of switches SW2 and SW3. According to FIG. 13B, when the switching signal specifies the use, the switch SW2 is connected to the terminal "a", while the switch SW3 is connected to the terminal "a". Therefore, the input signal is multiplied and synthesized with a signal "g" input from the frequency divider circuit 625 by the mixer 6241 and is frequency-converted. The frequency-converted signal passes through the filter circuit 6242 and the amplifier 6243 to output as an output signal of the basic circuit 624B. Namely, the basic circuit 624 is in a state of "use."

When the use/non-use switching signal sf specifies "non-use", the switch SW2 is connected to the terminal "b", while the switch SW3 is connected to the terminal "b". Therefore, the input signal is not subjected to frequency conversion but output as an output signal of the basic circuit 624, without any change. Namely, the basic circuit 624 is in a "non-use" state.

As described above, according to Embodiment 2, the multi-stage frequency conversion circuit 623B is constituted with a plurality of basic circuits 624B identical in constitution, and a use/non-use switching signal sf input externally is used to switch the use/non-use of individual basic circuits 624B. Therefore, the use/non-use switching signal sf is set in accordance with a frequency of a standard radio wave to be input, thereby to make it possible to provide a general-purpose radio wave receiving apparatus 620 in which only the necessary basic circuit 624B is used but other basic circuits 624 are not used.

Embodiment 3

Next, an explanation will be made for Embodiment 3.

Figures 14A, 14B:
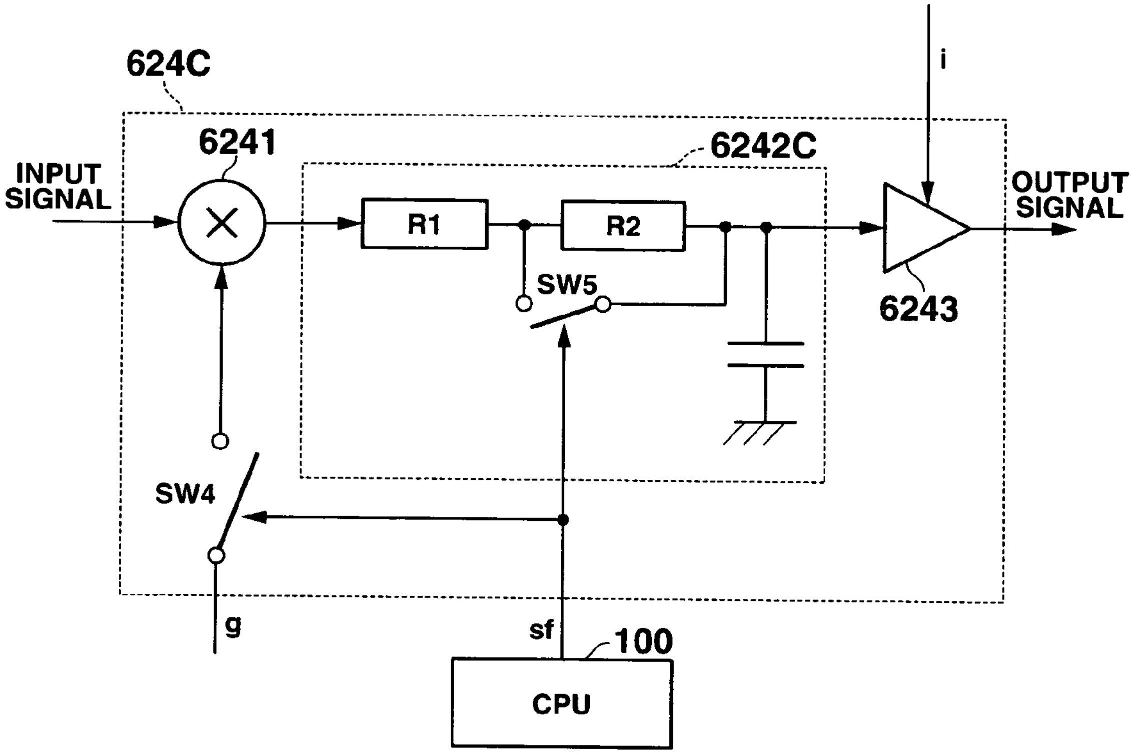
FIG. 14A is a block diagram of a basic circuit of Embodiment 3 in the present invention.
FIG. 14B is a table showing the relationship between the use/non-use of a basic circuit 624C given in FIG. 14A and the connected state of switches SW5 and SW3.

Similarly to Embodiment 2 described above, Embodiment 3 is an embodiment of a multiband radio wave receiving apparatus 620, and different from Embodiment 2 in that the basic circuit 624B shown in FIG. 13A is replaced by the basic circuit 624C shown in FIG. 14A.

FIG. 14A is a view illustrating a circuit configuration of a basic circuit 624C in Embodiment 3. In FIG. 14A, the basic circuit 624C is constituted with a mixer 6241, a filter circuit 6242C, an amplifier 6243 and a switch SW4.

The switch SW4 is provided between the mixer 6241 and the frequency divider circuit 625, and controlled for ON/OFF in accordance with a use/non-use switching control signal sf input from the CPU 100.

The filter circuit 6242C is provided with serially-connected registers R1 and R2, a capacitor C and a switch SW5 connected in parallel to the register R2. Herein, the switch SW5 is controlled for ON/OFF in accordance with a use/non-use switching signal input from the SW5.

FIG. 14B is a view illustrating the relationship between the use/non-use switching signal sf and the connection state of the switch SW5. According to FIG. 14B, when "use" is specified by the use/non-use switching signal sf, the switch SW4 is turned on, while the switch SW5 is turned off. Therefore, the mixer 6241 performs synthesis by multiplying the input signal by a signal "g" input from the frequency divider circuit 625 to perform frequency conversion, and outputs as an output signal of the basic circuit 624C. Further, in this case, the filter circuit 6242C functions as a low pass filter having a pass band dependent on the respective register values of the registers R1, R2 and a capacitance value of the capacitor C. Namely, the basic circuit 624 is in a "use" state.

Further, when "non-use" is specified by the use/non-use switching signal sf, the switch SW4 is turned off and the switch SW5 is turned on. Therefore, since a signal "g" from the frequency divider circuit 625 is not input into the mixer 6241, an input signal is not subjected to frequency conversion but passes through the filter circuit 6242C and outputs as an output signal. Namely, the basic circuit 624 is in a state of "non-use." In this case, the filter circuit 6242C is given as a RC filter made up of the register R1 and the capacitor C, but the register R1 is so small in register value that it will not actually function as a filter.

As described above, according to Embodiment 3, the multi-stage frequency conversion circuit 623 is constituted with a plurality of basic circuits 624C identical in constitution, and a use/non-use switching signal input from the outside is used to switch the use/non-use of individual basic circuits 624C. Therefore, the use/non-use switching signal sf is set in accordance with a frequency of a standard radio wave to be received, thereby to make it possible to provide a general-purpose radio wave receiving apparatus 620, in which only the necessary basic circuits 624C are used but other basic circuits 624C are not used.

Embodiment 4

Next, an explanation will be made for Embodiment 4.

Figure 15:
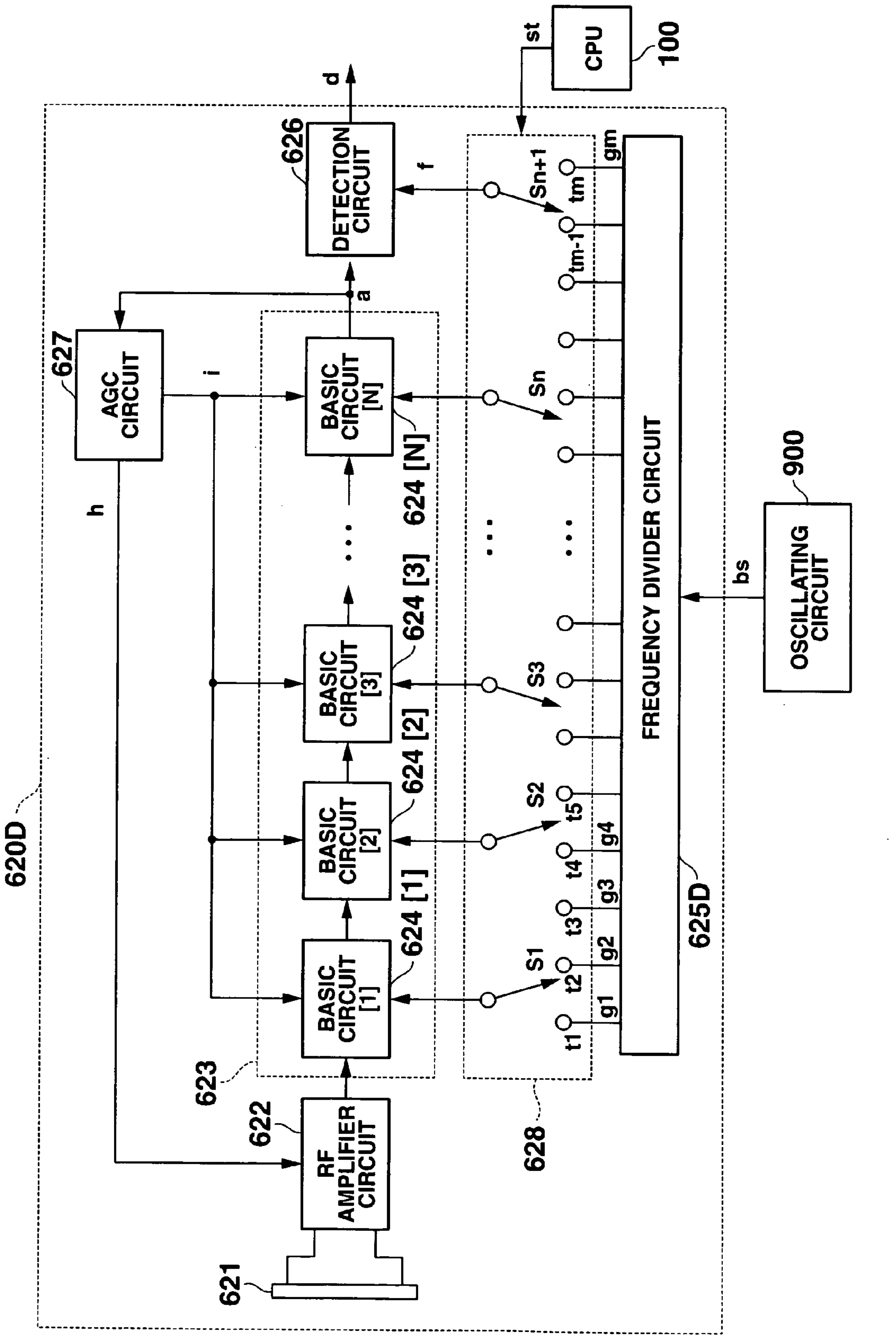
FIG. 15 is a block diagram of a radio wave receiving apparatus of Embodiment 4 in the present invention.

FIG. 15 is a block diagram illustrating a schematic constitution of a radio wave receiving apparatus 620D in Embodiment 4. In the figure, the radio wave receiving apparatus 620D is constituted with a receiving antenna 621, an RF amplifier circuit 622, a multi-stage frequency conversion circuit 623, a frequency divider circuit 625D, a detection circuit 626, an AGC circuit 627 and a switch group 628.

An explanation will be omitted for a block of functions and constitutions which is similar to that explained in FIG. 2.

The frequency divider circuit 625D is provided with a plurality of output terminals of t1, t2, t3, . . . , tm for outputting signals g1, g2, g3, . . . , gm obtained by frequency-dividing a reference frequency signal bs input from the transmitting circuit section 900 by the frequency dividing ratios of 2, 1, ½, ¼, . . . , $½^{(m-2)}$ (m is an integral number), respectively.

The switch group 628 comprises a plurality of switches S1, S2, . . . , Sn provided between the respective basic circuits 624[1], 624[2], . . . , 624[N] in the multi-stage frequency conversion circuit 623 and the frequency divider circuit 625, and switches Sn+1 provided between the detection circuit 626 and the frequency divider circuit 625; These switches S1, S2, . . . , Sn+1 are respectively connected to any one of the output terminals t1, t2, t3, . . . , tm of the frequency divider circuit 625, for example, in accordance with a selected signal "st" input from a CPU 100.

As described above, in a case of a multiband radio wave receiving apparatus 620, a frequency of a signal "g" input into each of the basic circuits 624 in the multi-stage frequency conversion circuit 623 is different, depending on the frequency of a standard radio wave to be received. Therefore, similarly to Embodiment 4, a selected signal "st" input from outside is used to switch the connection of each of the switches S in the switch group 628 provided between each of the basic circuits 624 and the detection circuit 626, and the frequency divider circuit 625, thereby to make it possible to switch a frequency of a signal "g" input into the basic circuits 624[1], 624[2] 624[N] and to provide a multiband radio wave receiving apparatus 620 with a general-purpose composition.

Further, each of these conversion circuits is made identical in constitution, for example, a frequency-divided signal is switched depending on a frequency of the received signal or a stage at which the conversion circuit is positioned in a plurality of serially-connected conversion circuits, thereby to make it possible to provide a general-purpose constitution.

Embodiment 5

Next, an explanation will be made for Embodiment 5.

As described above, at each of the basic circuits 624 in the multi-stage frequency conversion circuit 623, an input signal is frequency-converted (down conversion) on the basis of a frequency-divided signal "g". However, there may be a problem of generating an image signal resulting from the frequency conversion.

Figure 17A:
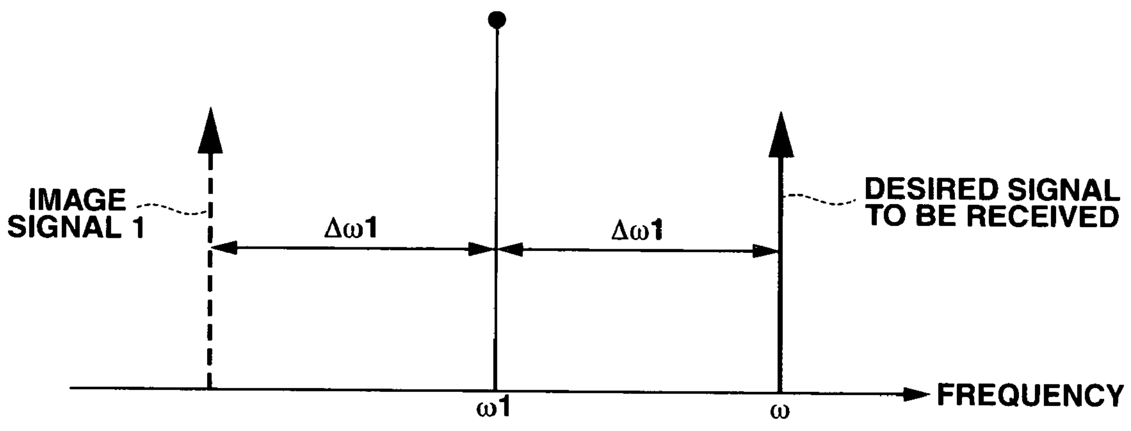
FIG. 17A is a view of explaining an image signal.

For example, when a signal of frequency ω is received, frequency conversion performed by using a frequency-divided signal of frequency ω1 as a local signal will result in a fact that a signal of frequency (image signal 1) positioned symmetrically to a desired signal to be received with respect to the frequency ω1, on a frequency axis, in addition to a signal of the desired frequency ω to be received (the desired signal), as illustrated in FIG. 17A.

Figure 17B:
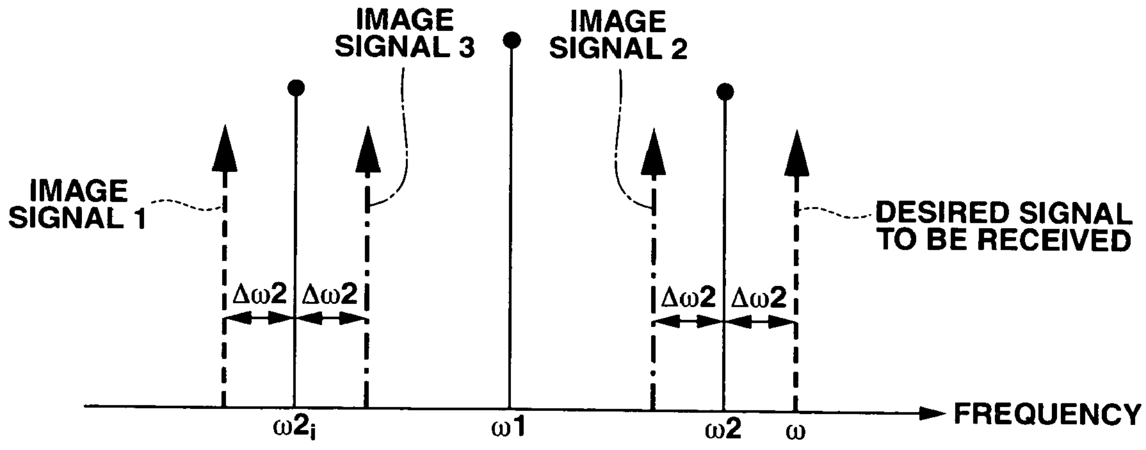
FIG. 17B is a view of explaining an image signal.

Next, when performing an additional frequency conversion by using a frequency-divided signal of frequency ω2 as a local signal, as illustrated in FIG. 17, a frequency conversion is performed for each of the desired signal to be received and the image signal 1. Namely, by the frequency conversion for the desired signal to be received, a signal of frequency (image signal 2) positioned symmetrically to the desired signal to be received, with respect to the frequency ω2 is also received. Further, by the frequency conversion for the image signal 1, a signal of frequency (image signal 3) positioned symmetrically to the image signal 1, with respect to the frequency $\omega\mathbf{2}_i$ is received. The frequency $\omega\mathbf{2}_i$ is a frequency positioned symmetrically to the frequency of ω2 with respect to the frequency ω1.

Figure 18:
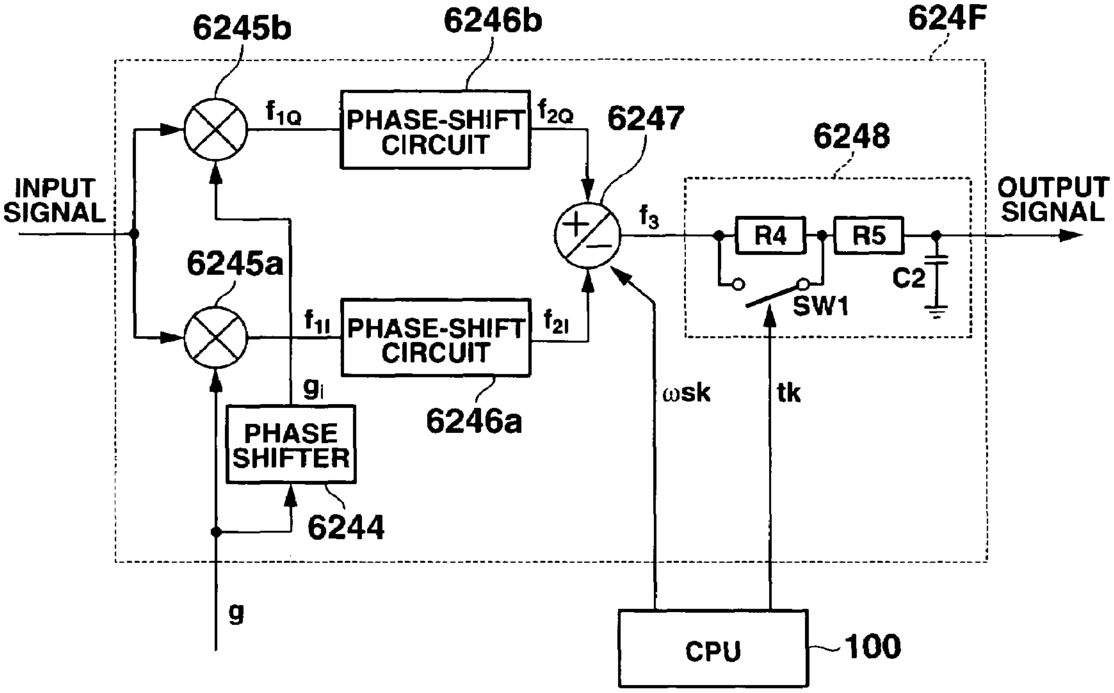
FIG. 18 is a block diagram of a basic circuit of Embodiment 5 in the present invention.

Namely, by two-stages frequency conversion, a total of 4 signals which include one desired signal to be received and three image signals 1 to 3 are received. Therefore, when n-stages of the frequency conversion are performed, an additional number $(2^n-1)$ of image signals are received, in addition to a desired signal to be received. Therefore, in Embodiment 5, in order to remove these image signals, each of the basic circuits 624 is constituted as follows. FIG. 18 is a view illustrating a circuit configuration of a basic circuit 624F in Embodiment 5. According to the figure, the basic circuit 624F is constituted with a phase shifter 6244, mixers 6245*a*, 6245*b*, phase-shift circuits 6246*a*, 6246*b*, an adder-subtractor 6247 and a filter circuit 6248.

The phase shifter 6244 performs a 90-degree phase shift to a signal "g" input from the frequency divider circuit 625, thereby to output it as a signal "$g_i$". The mixer 6245*a* makes synthesis by multiplying an input signal into the basic circuit 624F by a signal "g", thereby to output them as a signal "$f_{1I}$". The mixer 6245*b* makes synthesis by multiplying an input signal by a signal "$g_i$" input from the phase shifter 6244, thereby to output them as a signal "$f_{1Q}$".

The phase-shift circuit 6246*a* allows a signal "$f_{1I}$" input from the mixer 6245*a* to undergo phase shift, thereby to output it as a signal "$f_{2I}$". The phase-shift circuit 6246*b* allows a signal "$f_{1Q}$" input from the mixer 6245*b* to undergo phase shift, thereby to output it as a signal "$f_{2Q}$". Herein, the phase-shift circuits 6426*a* and 6246*b* are constituted in such a way that a difference in phase shift (difference in phase shift angle) between the phase-shift circuit 6246*a* and the 6246*b* is at 90 degrees (π/2). For example, where the phase-shift circuit 6246*a* allows the signal "$f_{1I}$" to undergo "α" phase shift, the phase-shift circuit 6246*b* is constituted so as to allow the signal "$f_{1Q}$" to undergo "α-π/2" phase shift.

Figure 19:
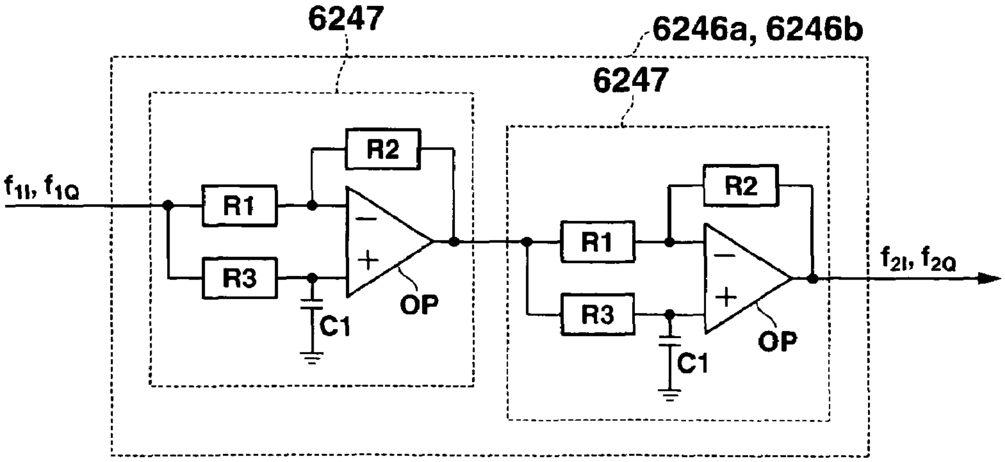
FIG. 19 is a block diagram of a phase-shift circuit of Embodiment 5 in the present invention.

FIG. 19 is a view illustrating the circuit configurations of the phase-shift circuit 6246*a* and 6246*b*. As given in the figure, the phase-shift circuits 6246*a* and 6246*b* are identical in constitution and constituted with a two-stage APF (All Pass Filter) 6247 connected in series. The APF 6247 is a filter which allows only a phase to change and is provided with an operational amplifier OP, registers R1, R2, and R3 and a capacitor C1. An output level of the APF 6247 is dependent on values of the registers R1 and R2, and a phase shift level of the APF 6247 is dependent on those of the register R3 and the capacitor C1. Since a one-stage APF 6247 can perform a phase shift up to 180 degrees, the phase-shift circuits 6246*a* and 6246*b* comprising a two-stage APF 6247 can perform a phase shift up to 360 degrees.

In FIG. 18, the adder-subtractor 6247 makes synthesis by adding or subtracting a signal "$f_{2I}$" input from the phase-shift circuit 6246*a* to or from a signal "$f_{2Q}$" input from the phase-shift circuit 6246*b*, thereby to output them as a signal "$f_3$", for example, depending on a sum/difference switching signal wsk input from a CPU 100.

The filter circuit 6248 is an LPF (Low Pass Filter), allowing frequencies in a predetermined low range to pass through with respect to a signal "$f_3$" input from the adder-subtractor 6247, while cutting off frequency components beyond the range. The filter circuit 6248 includes serially-connected registers R4 and R5, a capacitor C2 and a switch SW1 connected in parallel to the register R4. The switch SW1 is controlled for ON/OFF, for example, depending on a time constant switching signal tk input from the CPU 100. The switch SW1 is switched ON/OFF, thereby to change a time constant of the filter circuit 6248, namely, to switch a pass band. An output signal from the filter circuit 6248 is given as an output signal of a basic circuit 624F.

Figure 20A:
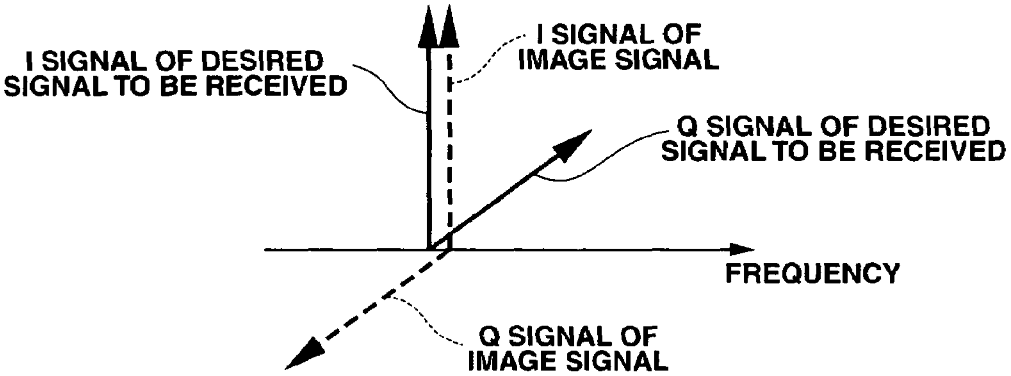
FIG. 20A is a view of explaining a principle of removing an image signal of Embodiment 5 in the present invention.
Figure 20B:
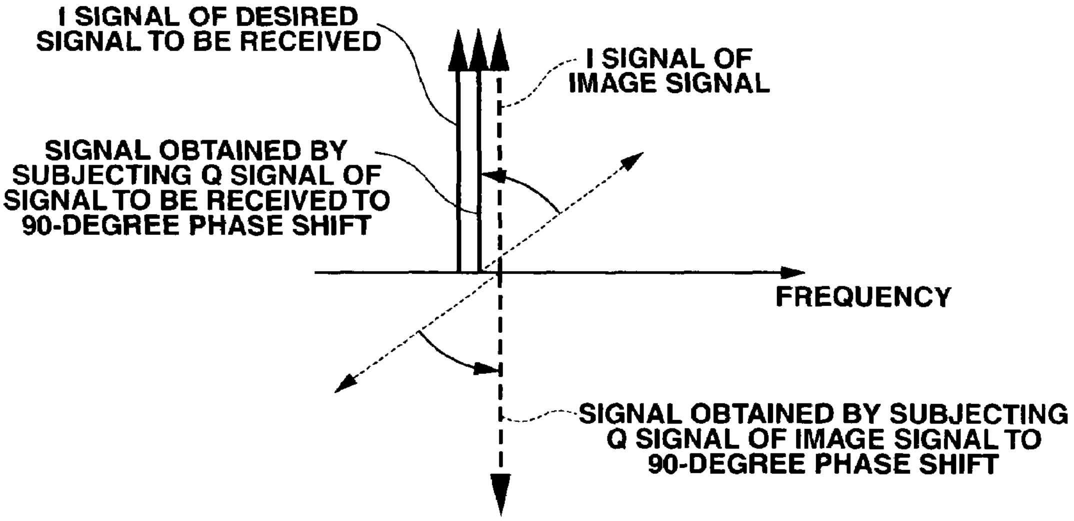
FIG. 20B is a view of explaining a principle of removing an image signal of Embodiment 5 in the present invention.

The basic circuit 624F generates input signals of I and Q signals, allows the generated Q signal to undergo a 90-degree phase shift with respect to the I signal to effect synthesis, thereby removing an image signal. FIG. 20A and FIG. 20B are views for explaining a principle of removing an image signal by the basic circuit 624F, a lengthwise direction is given as a real axis (I component), and an oblique depth direction is given as an imaginary axis (Q component) to indicate a concept of the phase-shift relationship between a desired signal to be received and an image signal. Further, the solid line indicates the desired signal to be received and the dotted line indicates the image signal.

As illustrated in FIG. 20A, a desired signal to be received and an image signal respectively have I and Q signals, which are mutually orthogonal. Since the desired signal to be received is positioned symmetrical with respect to the image signal mainly at a frequency of a frequency-divided signal "g" (local signal) on a frequency axis, the respective I signals of the desired signal to be received and the image signal are in phase, while the respective Q signals of the desired signal to be received and the image signal are in reverse phase.

Then, when the Q signal is allowed to undergo a 90-degree phase shift, as illustrated in FIG. 20B, the respective Q signals of the desired signal to be received and the image signal undergo a 90-degree phase shift, the I and Q signals of the desired signal to be received are in phase, while those of the image signal are in reverse phase. Therefore, synthesis of the phase-shifted I and Q signals will result in cancellation of an image signal component to take out only a desired signal component to be received.

Concretely, in the basic circuit 624F, the mixers 6245*a* and 6245*b* use signals (signals "g" and "$g_i$") in which input signals are mutually orthogonal to effect frequency conversion, thereby to generate I and Q signals (signal "$f_{1I}$" and "$f_{1Q}$"). Then, the generated I and Q signals are phase-shifted by the phase-shift circuits 6246*a* and 6246*b* (signals "$f_{2I}$" and "$f_{2Q}$"), and added/subtracted by the adder-subtractor 6247, thereby removing an image signal and outputting only a desired signal to be received.

As described above, according to Embodiment 5, each of the basic circuits 624F is constituted in such a way that each signal obtained by subjecting the respective input signals of I and Q signals to frequency conversion by using a signal "g" is phase-shifted to give a 90-degree phase-shift difference, added and synthesized, thereby to make it possible to remove an image signal component resulting from the frequency conversion.

In other words, the serially-connected basic circuit 624F multiplies an input signal by a signal "g" input from the frequency divider circuit 625 and a signal obtained by subjecting the signal "g" to a 90-degree phase shift, allows the multiplied signals to undergo a phase shift so as to give a 90-degree phase-shift difference with respect to each of the multiplied signals, and adds and subtracts them to output as a conversion signal. Thereby, I and Q signals obtained by subjecting the input signal to frequency conversion are phase-shifted so as to respectively give a 90-degree phase-shift difference, added and subtracted, thereby to make it possible to remove an image signal component resulting from the frequency conversion.

Other Embodiments

Other embodiments may also be available, which are combinations of Embodiments 1 to 4 described above.

[Function and Effect]

As described above, according to the radio wave timepiece 1 in the present embodiment, each of serially connected basic circuits 624 in a multi-stage frequency conversion circuit 623 makes synthesis by multiplying received signals received at a receiving antenna 621 by a signal "g" obtained by dividing a reference frequency signal bs at a predetermined frequency dividing ratio, thereby gradually decreasing the frequency. Then, in a detection circuit 626, detection is performed on the basis of a signal "a", the frequency of which is decreased, thereby to output a detected signal "d". Herein, since an oscillating signal for a timepiece generated by an oscillating circuit section 900 is used as a reference frequency signal bs, a local oscillating circuit, which was required in a conventional radio wave receiving apparatus based on super-heterodyne system, is no longer necessary. More specifically, since no PLL circuit is required, signals are received in a highly stable manner, which is free of any power-supply variation or variation in frequency resulting from ON/OFF operation at a power source, and an electric power consumed as a whole system can be decreased. Further, a multi-stage frequency conversion in which synthesis is made by multiplying received signals by the frequency-divided signal "g" to attain a gradual decrease in frequency makes it possible to receive signals at a high accuracy. In addition, each of the basic circuits 624 may be constituted with simple circuit elements, thereby to make it possible to provide a large-scale integration and reduce the dimension of chips, although the circuits are provided in a multiple stage and accordingly made larger in size.

Modified Embodiment

Additionally, an embodiment in which the present invention is applicable is not limited to the embodiments described above but may be changed appropriately within a scope not deviating from an object of the present invention.

In the embodiments described above, the detection circuit 626 performs detection on the basis of a signal "a" output from the multi-stage frequency conversion circuit 623 to output a detected signal "d". However, a final stage of the basic circuit 624 in the multi-stage frequency conversion circuit 623 may also act as the detection circuit 626.

Figure 16:
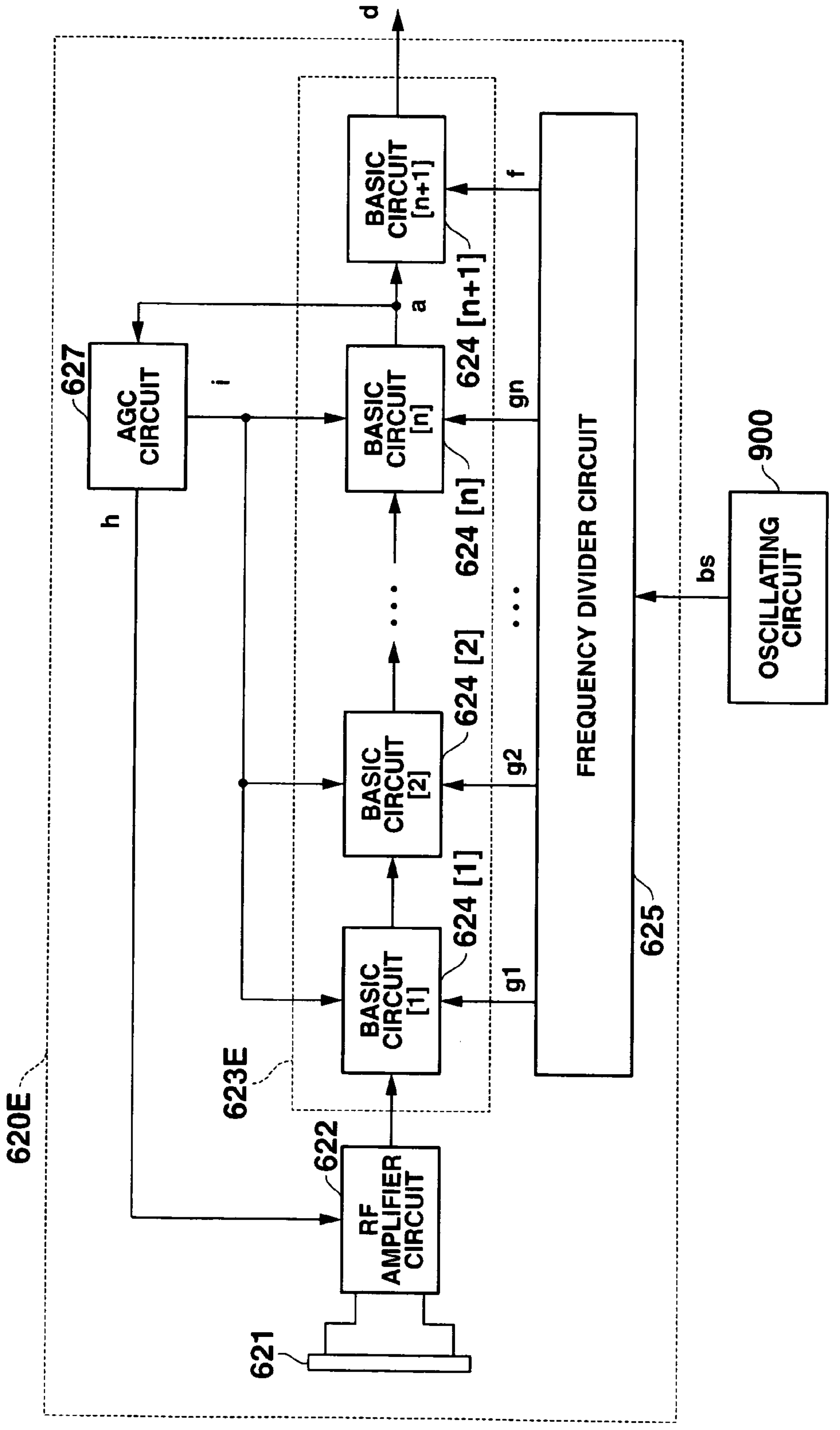
FIG. 16 is a block diagram of a radio wave receiving apparatus of an exemplary modification in the present invention.

FIG. 16 is a block diagram illustrating a constitution of a radio wave receiving apparatus 623E in this case. According to the figure, the radio wave receiving apparatus 623E is different in constitution from the radio wave receiving apparatus 623 shown in FIG. 2 in that it is provided with the multi-stage frequency conversion circuit 623E including serially connected n-stages of basic circuits 624[1], 624[2], . . . , 624[N] and 624[n+1] but not provided with the detection circuit 626.

A signal "a" from the previous stage of the basic circuit 624[N] and a signal "f" obtained by dividing a reference frequency signal bs from the frequency divider circuit 625 by a predetermined frequency dividing ratio, which is identical in frequency with the signal "a", are respectively input into the final stage of the basic circuit 624[n+1] in the multi-stage frequency conversion circuit 623. Then, the basic circuit 624 [n+1] outputs the signal "a" and a signal d, which is a difference frequency signal of the signal "f". Since the signal "a" and the signal "f" are identical in frequency, the signal "d" is of 0 Hz. In other words, the output signal "d" from the multi-stage frequency conversion circuit 623 is a detected signal which has detected the signal "a", namely, a signal which has regenerated a received signal.

Figure 21:
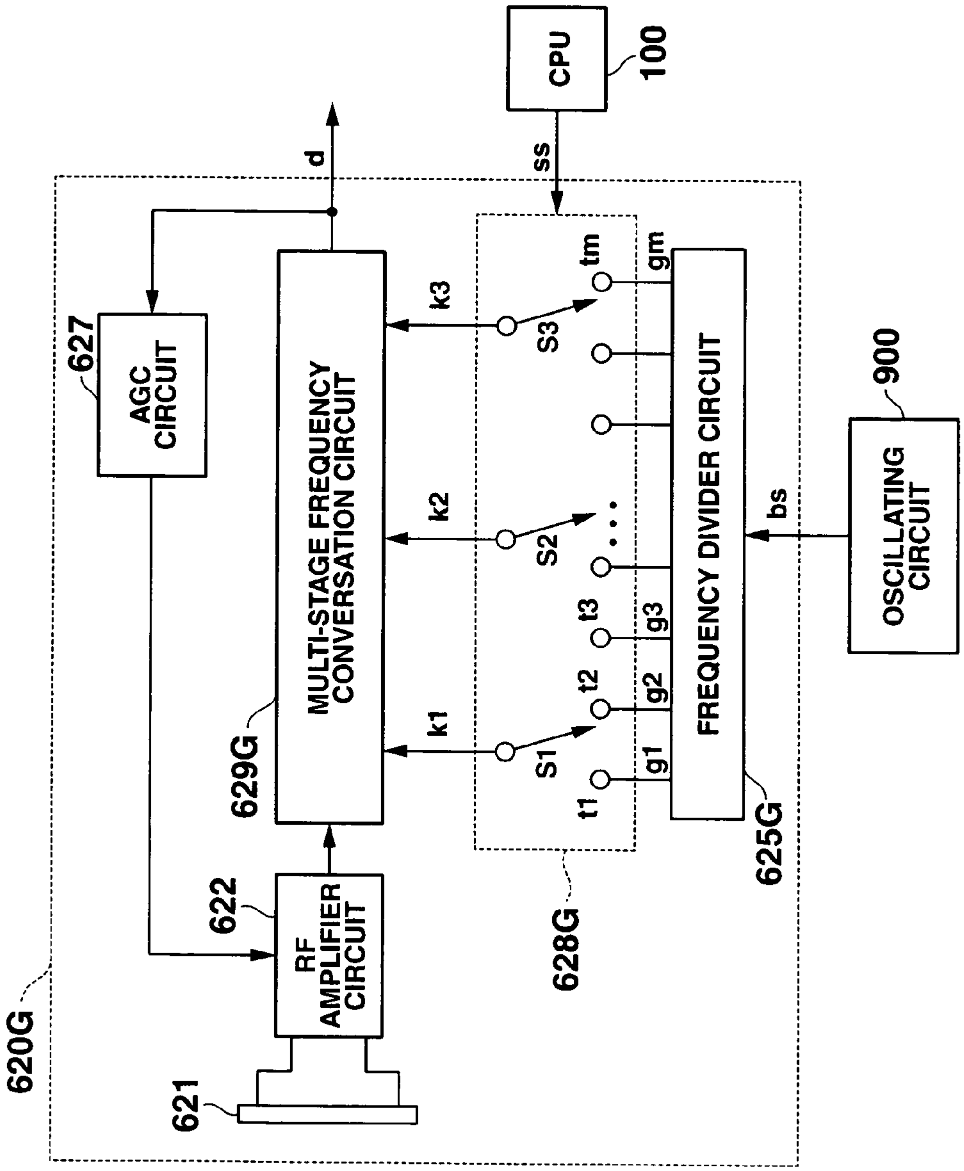
FIG. 21 is a block diagram of a radio wave receiving apparatus of an exemplary modification in the present invention.

Further, the radio wave receiving apparatus 620 may be constituted as illustrated in FIG. 21, which is a constitution in which the detection circuit 626 is included in the multi-stage frequency conversion circuit 623.

FIG. 21 is a block diagram illustrating a constitution of a radio wave receiving apparatus 620G in this case. The radio wave receiving apparatus 620G is to remove an image signal according to the same principle of Embodiment 5 described above, and constituted with a receiving antenna 621, a RF amplifier circuit 622, a multi-stage frequency conversion circuit 626G, a frequency divider circuit 625G, an AGC circuit 627 and a switch group 628G. Additionally, an explanation will be omitted for a block of functions and constitutions which is similar to that explained in FIG. 2.

The frequency divider circuit 625G divides a reference frequency signal bs input from a transmitting circuit section 900 by the respective frequency dividing ratios of 2, 1, ½, ¼, . . . , $1/2^{(m-2)}$ (m is an integral number) and outputs the divided signals g1, g2, g3, . . . , gm respectively at output terminals of t1, t2, t3, . . . , tm.

The switch group 628G includes a plurality of switches S1 to S3 provided between a multi-stage frequency conversion circuit 629G and a frequency divider circuit 625G. These switches S1 to S3 are respectively connected to any one of output terminals t1, t2, . . . , tm of the frequency divider circuit 625G, for example, in accordance with a selected signal ss input from a CPU 100. Then, signals "g" output to the output terminals t connected to the respective switches S1 to S3 are input into the multi-stage frequency conversion circuit 629G as signals k1 to k3.

The multi-stage frequency conversion circuit 629G converts input signals from the RF amplifier circuit 622 into those having gradually lower frequencies on the basis of signals k1 to k3 input via the switch group 628G from the frequency divider circuit 625G and outputs them as signals "d".

Figure 22:
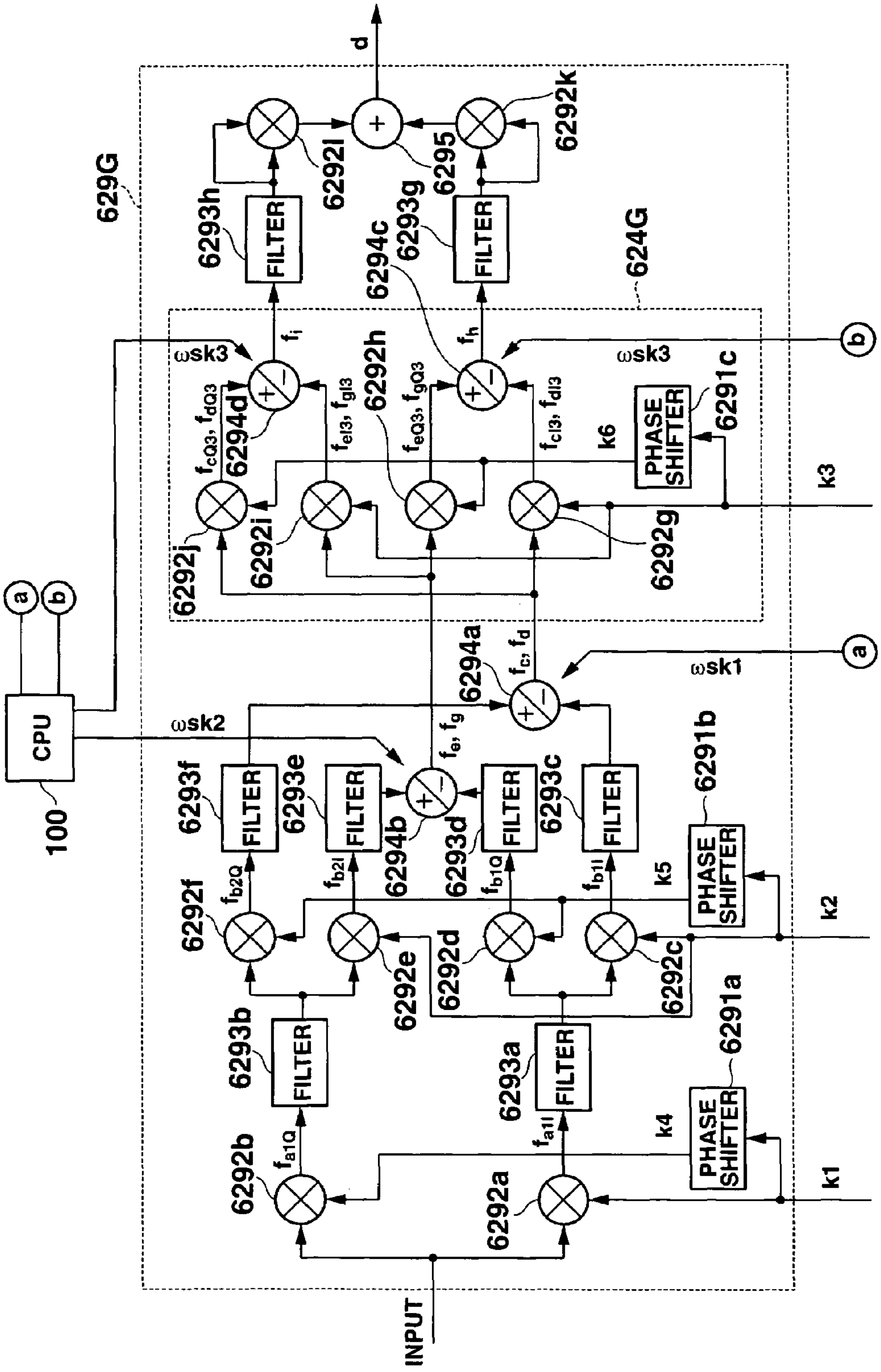
FIG. 22 is a block diagram of a multi-stage frequency conversion circuit of an exemplary modification in the present invention.

FIG. 22 is a view illustrating a circuit configuration of the multi-stage frequency conversion circuit 626G. According to the figure, the multi-stage frequency conversion circuit 629G is constituted with phase shifters 6291*a* to 6291*c*, mixers 6292*a* to 6262*l*, filters 6293*a* to 6293*h*, adders-subtractors 6294*a* to 6294*d* and an adder 6295.

The mixer 6292*a* makes synthesis by multiplying a signal input into the multi-stage frequency conversion circuit 629G by a signal k1 to output them as a signal $f_{a1I}$. The filter 6293*a* is an LPF, allowing frequencies in a low frequency range including a difference frequency between the input signal and the signal k1 to pass through with respect to the signal $f_{a1I}$ input from the mixer 6292_a_ to output them, while cutting off frequency components beyond the range including a sum frequency.

The phase shifter 6291_a_ allows the input signal k1 to undergo a 90-degree phase shift and outputs it as a signal k4. The mixer 6292_b_ makes synthesis by multiplying the input signal by the signal k4 input from the phase shifter 6291_a_, thereby to output them as a signal $f_{a1Q}$. The filter 6293_b_ is a LPF, allowing frequencies in a low frequency range including a difference frequency between the input signal and the signal k1 to pass through with respect to the signal $f_{a1Q}$ input from the mixer 6292_b_ to output them, while cutting off frequency components beyond the range including a sum frequency.

The mixer 6292_c_ makes synthesis by multiplying a signal $f_{a1I}$ input via the filter 6293_a_ from the mixer 6292_a_ by a signal k2 to output them as a signal $f_{b1I}$. The filter 6293_a_ is a LPF, allowing frequencies in a low frequency range including a difference frequency between the signal $f_{a1I}$ and the signal k2 to pass through with respect to the signal $f_{b1I}$ input from the mixer 6292_c_ to output them, while cutting off frequency components beyond the range including a sum frequency.

The phase shifter 6291_b_ allows the input signal k2 to undergo a 90-degree phase shift and outputs it as a signal k5. The mixer 6292_d_ makes synthesis by multiplying the signal $f_{a1I}$ input via the filter 6293_a_ from the mixer 6292_a_ by the signal k5 input from the phase shifter 6291_b_ to output them as a signal $f_{b1Q}$. The filter 6293_d_ is a LPF, allowing frequencies in a low frequency range including a difference frequency between the signal $f_{a1I}$ input from the mixer 6292_d_ and the signal k2 to pass through with respect to the signal $f_{b1Q}$ input from the mixer 6292_d_ to output them, while cutting off frequency components beyond the range including a sum frequency.

The mixer 6292_e_ makes synthesis by multiplying the signal $f_{a1Q}$ input via the filter 6293_b_ from the mixer 6292_b_ by the signal k2 to output them as a signal "$f_{b2I}$". The filter 6293_e_ is a LPF, allowing frequencies in a low frequency range including a difference frequency between the signal "$f_{a1Q}$" and the signal k2 to pass through with respect to the signal $f_{b2I}$ input from the mixer 6292_e_ to output them, while cutting off frequency components beyond the range including a sum frequency.

The mixer 6292_f_ makes synthesis by multiplying the signal $f_{a1Q}$ input via the filter 6293_b_ from the mixer 6292_b_ by the signal k5 input from the phase shifter 6291_b_ to output them as a signal $f_{b2Q}$. The filter 6293_f_ is a LPF, allowing frequencies in a low frequency range including a difference frequency between the signal $f_{a1Q}$ and the signal k2 to pass through with respect to the signal $f_{b2Q}$ input from the mixer 6292_f_ to output them, while cutting off frequency components beyond the range including a sum frequency.

The adder-subtractor 6294_a_ makes synthesis by adding or subtracting a signal $f_{b1I}$ input via the filter 6293_c_ from the mixer 6292_c_ to and from a signal $f_{b2Q}$ input via the filter 6293_f_ from the mixer 6292_f_, thereby to output them in accordance with a sum/difference switching signal 1 (wsk 1) to be input. The sum/difference switching signal 1 (wsk 1) is a signal for specifying operational contents (addition/subtraction) of the adder-subtractor 6294_a_ and input, for example, from a CPU 100. Then, the adder-subtractor 6294_a_ makes synthesis by adding the signal $f_{b1I}$ to the signal $f_{b2Q}$, thereby to output them as a signal $f_d$, where "addition" is specified by the sum/difference switching signal 1 (wsk 1), and makes synthesis by subtracting the signal $f_{b1I}$ from the signal $f_{b2Q}$, thereby to output them as a signal $f_c$, where "subtraction" is specified.

The adder-subtractor 6294_b_ makes synthesis by adding or subtracting a signal $f_{b1Q}$ input via the filter 6293_d_ from the mixer 6292_d_ to and from a signal $f_{b2I}$ input via the filter 6293_e_ from the mixer 6292_e_ in accordance with a sum/difference switching signal 2 (wsk 2) to be input, thereby to output them. The sum/difference switching signal 2 (wsk 2) is a signal for specifying operational contents of the adder-subtractor 6294_b_ and input, for example, from a CPU 100. The adder-subtractor 6294_b_ makes synthesis by adding the signal $f_{b1Q}$ to the signal $f_{b2I}$ thereby to output them as a signal $f_g$, where "addition" is specified by the sum/difference switching signal 2 (wsk 2), and makes synthesis by subtracting the signal $f_{b1Q}$ from the signal $f_{b2I}$, thereby to output them as a signal $f_e$, where "subtraction" is specified.

The mixer 6292_g_ makes synthesis by multiplying a signal input from the adder-subtractor 6294_a_ by a signal k3 to output them. More specifically, where a signal $f_c$ is input from the adder-subtractor 6294_a_, it makes synthesis by multiplying the signal $f_c$ by the signal k3 to output them as a signal $f_{cI3}$, and where a signal $f_d$ is input, it makes synthesis by multiplying the signal $f_d$ by the signal k3 to output them as a signal $f_{dI3}$.

The phase shifter 6291_c_ allows the input signal k3 to undergo a 90-degree phase shift and outputs it as a signal k6. The mixer 6292_h_ makes synthesis by multiplying a signal input from the adder-subtractor 6294_b_ by the signal k6 input from the phase shifter 6291_c_ to output them. More specifically, where a signal $f_e$ is input from the adder-subtractor 6294_b_, it makes synthesis by multiplying the signal $f_e$ by the signal k6 to output them as a signal $f_{eQ3}$, and where a signal $f_g$ is input, it makes synthesis by multiplying the signal $f_g$ by the signal k6 to output them as a signal $f_{gQ3}$.

The mixer 6292_i_ makes synthesis by multiplying a signal input from the adder-subtractor 6294_b_ by a signal k3 to output them. More specifically, where a signal $f_e$ is input from the adder-subtractor 6294_b_, it makes synthesis by multiplying the signal $f_e$ by the signal k3 to output them as a signal $f_{eI3}$, and where a signal $f_g$ is input, it makes synthesis by multiplying the signal $f_g$ by the signal k3 to output them as a signal $f_{gI3}$.

The mixer 6292_j_ makes synthesis by multiplying a signal input from the adder-subtractor 6294_a_ by a signal k6 input from the phase shifter 6291_c_ to output them. More specifically, where a signal $f_c$ is input from the adder-subtractor 6294_a_, it makes synthesis by multiplying the signal $f_c$ by the signal k6 to output them as a signal $f_{eQ3}$, and where a signal $f_d$ is input, it makes synthesis by multiplying the signal $f_d$ by the signal k6 to output them as a signal $f_{dQ3}$.

The adder-subtractor 6294_c_ makes synthesis by adding or subtracting signals input respectively from the mixers 6292_g_ and 6292_h_ in accordance with a sum/difference switching signal 3 (wsk 3) to be input, thereby to output them. The sum/difference switching signal 3 (wsk 3) is a signal for specifying operational contents of the adder-subtractor 6294_c_ and input, for example, from a CPU 100. The adder-subtractor 6294_c_ makes synthesis by adding a signal input from the mixer 6292_g_ (signal $f_{cI3}$ or signal $f_{dI3}$) to a signal input from the mixer 6292_h_ (signal $f_{eQ3}$ or signal $f_{gQ3}$), thereby to output them as a signal $f_h$, where "addition" is specified by the sum/difference switching signal 3 (wsk 3), and makes synthesis by subtracting a signal input from the mixer 6292_g_ (signal $f_{cI3}$ or signal $f_{dI3}$) from a signal input from the mixer 6292_h_ (signal $f_{eQ3}$ or signal $f_{gQ3}$), thereby to output them as a signal $f_h$ where "subtraction" is specified.

The filter circuit 6293_g_ is a LPF, allowing frequencies in a low frequency range including a difference frequency between signals output respectively from the mixers 6292_g_ and 6292_h_ to pass through with respect to a signal $f_h$ input from the adder-subtractor 6294*c* to output them, while cutting off frequency components beyond the range including a sum frequency.

The adder-subtractor 6294*d* makes synthesis by adding or subtracting signals input respectively from the mixers 6292*i* and 6292*j* in accordance with a sum/difference switching signal 4 (wsk 4) to be input, thereby to output them. The sum/difference switching signal 4 (wsk 4) is a signal for specifying operational contents of the adder-subtractor 6294*d* and input, for example, from a-CPU 100. The adder-subtractor 6294*d* makes synthesis by adding signal input from the mixer 6292*i* (signal $f_{eI3}$ or signal $f_{gI3}$) to a signal input from the mixer 6292*j* (signal $f_{cQ3}$ or signal $f_{dQ3}$), thereby to output them as a signal $f_i$, where addition is specified by the sum/difference switching signal 4 (wsk 4), and makes synthesis by subtracting a signal input from the mixer 6292*i* (signal $f_{eI3}$ or signal $f_{gI3}$) from a signal input from the mixer 6292*j* (signal $f_{cQ3}$ or signal $f_{dQ3}$), thereby to output them as a signal $f_i$, where "subtraction" is specified.

The filter circuit 6293*h* is a LPF, allowing frequencies in a low frequency range including a difference frequency between signals output respectively from the mixers 6292*i* and 6292*j* to pass through with respect to a signal $f_i$ input from the adder-subtractor 6294*d* to output them, while cutting off frequency components beyond the range including a sum frequency.

The mixer 6292*k* squares a signal $f_h$ input via the filter 6293*g* from the adder-subtractor 6294*c* to output it. The mixer 6292*l* squares a signal $f_i$ input via the filter 6293*h* from the adder-subtractor 6294*d* to output it. The adder 6295 makes synthesis by adding signals input respectively from the mixers 6292*k* and 6292*l*, thereby to output them. A signal output from the adder 6295 is given as an output signal d of the multi-stage frequency conversion circuit 629G.

Next, an explanation will be made for a specific operation of the multi-stage frequency conversion circuit 629G. First, an assumption is made that a signal f (ω) input to the multi-stage frequency conversion circuit 629G is expressed by the following equation (4*a*) and a signal f'(ω) obtained by allowing the input signal to undergo a 90-degree phase shift is expressed by the following equation (4b).

$$f(\omega) = \cos\omega t = (e^{j\omega t} + e^{-j\omega t})/2 \tag{4a}$$

$$f'(\omega) = \sin\omega t = (e^{j\omega t} + e^{-j\omega t})/2j \tag{4b}$$

An additional assumption is made that signals k1 to k3 are expressed respectively by the following equations (5a) to (5c), and signals k4 to k6 obtained by allowing these signals k1 to k3 to respectively undergo a 90-degree phase shift are expressed by the following equations (6a) to (6c).

$$k1 = \cos\omega 1t = (e^{j\omega 1t} + e^{-j\omega 1t})/2 \tag{5a}$$

$$k2 = \cos\omega 2\text{t} = (e^{j\omega 2t} + e^{-j\omega 2t})/2 \tag{5b}$$

$$k3 = \cos\omega 3t = (e^{j\omega 3t} + e^{-j\omega 3t})/2 \tag{5c}$$

-continued $$k4 = \sin\omega 1t = (e^{j\omega 1t} - e^{-j\omega 1t})/2j \tag{6a}$$

$$k5 = \sin\omega 2t = (e^{j\omega 2t} - e^{-j\omega 2t})/2j \tag{6b}$$

$$k6 = \sin\omega 3t = (e^{j\omega 3t} - e^{-j\omega 3t})/2j \tag{6c}$$

In the multi-stage frequency conversion circuit 629G, first, the mixers 6292*a* and 6292*b* perform a first-stage frequency conversion with respect to an input signal f (ω). Namely, the input signal f (ω) is allowed to undergo frequency conversion with a signal k1 by using the mixer 6292*a*, thereby generating a signal $f_{a1I}$. The signal $f_{a1I}$ is expressed by the following equation (7).

$$\begin{aligned} f_{a1I} &= (1/4)(e^{j\omega t} + e^{-j\omega t})(e^{j\omega 1t} + e^{-j\omega 1t}) \\ &= (1/4)(e^{j(\omega+\omega 1)t} + e^{-j(\omega+\omega 1)t} + e^{j(\omega-\omega 1)t} + e^{-j(\omega-\omega 1)t}) \\ &= 1/2(1/2)\cdot\left\{\begin{matrix}(e^{j(\omega+\omega 1)t} + e^{-j(\omega+\omega 1)t}) + \\ (e^{j(\omega-\omega 1)t} + e^{-j(\omega-\omega 1)t})\end{matrix}\right\} \\ &= f(\omega+\omega 1) + f(\omega-\omega 1) \end{aligned} \tag{7}$$

Further, the input signal f (ω) is allowed to undergo frequency conversion with a signal k4 by using the mixer 6292*b*, thereby generating a signal $f_{a1Q}$. The signal $f_{a1Q}$ is expressed by the following equation (8).

$$\begin{aligned} f_{a1Q} &= (1/4j)(e^{j\omega t} + e^{-j\omega t})(e^{j\omega 1t} - e^{-j\omega 1t}) \\ &= (1/4j)(e^{j(\omega+\omega 1)t} + e^{-j(\omega-\omega 1)t} - e^{j(\omega-\omega 1)t} - e^{-j(\omega+\omega 1)t}) \\ &= 1/2(1/2j)\cdot\left\{\begin{matrix}(e^{j(\omega+\omega 1)t} - e^{-j(\omega+\omega 1)t}) - \\ (e^{j(\omega-\omega 1)t} - e^{-j(\omega-\omega 1)t})\end{matrix}\right\} \\ &= f(\omega+\omega 1-\pi/2) - f(\omega-\omega 1-\pi/2) \end{aligned} \tag{8}$$

Figure 23A:
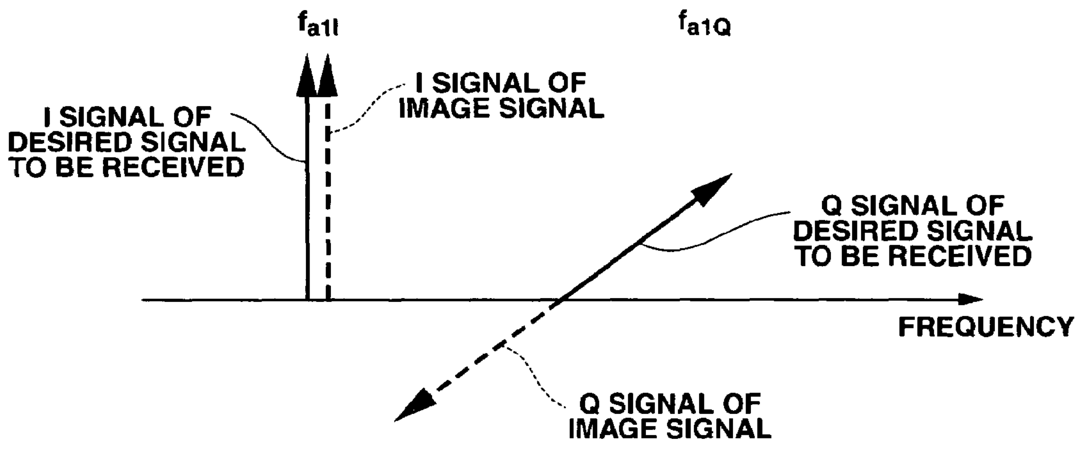
FIG. 23A is a conceptual view illustrating the phase relationship between two signals generated by frequency conversion at the first stage in the exemplary modification of the present invention.
Figure 23B:
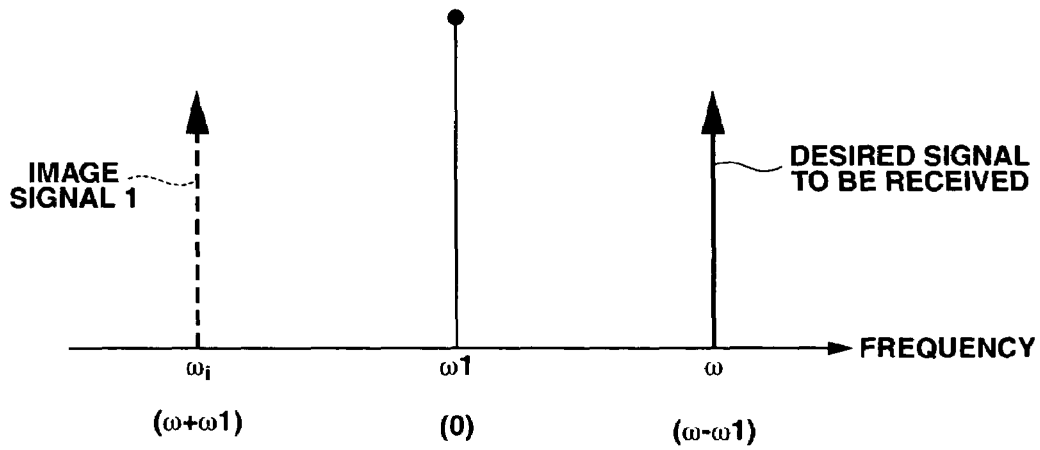
FIG. 23B is a conceptual view illustrating the relationship of frequencies between two signals generated by frequency conversion at the first stage in the exemplary modification of the present invention.

Therefore, according to the equations (7) and (8), the first-stage frequency conversion generates two signals having the respective frequencies of "ω+ω1" and "ω−ω1." FIG. 23A and FIG. 23B are views illustrating concepts of the relationship of two signals generated by the first-stage frequency conversion. FIG. 23A is a view illustrating a phase relationship, and FIG. 23B is a view illustrating a frequency relationship. The signal having a frequency of "ω−ω1" indicated by the solid line is a desired signal to be received, and the signal having a frequency of "ω+ω1" indicated by the dotted line is an image signal.

FIG. 23A is a view illustrating a phase relationship between the signal $f_{a1I}$ and the signal $f_{a1Q}$ on the same frequency axis. As illustrated in FIG. 23A, the signal $f_{a1I}$ is orthogonal with the signal $f_{a1Q}$. Further, signals $f_{a1I}$ are the respective I signals of an desired signal to be received and an image signal, which are in phase. Signals $f_{a1Q}$ are the respective Q signal of a desired signal to be received and an image signal, which are mutually in reverse phase. Further, as illustrated in FIG. 23B, a desired signal to be received is positioned symmetrical with respect to an image signal mainly at a frequency ω1 of signal k1 on a frequency axis.

Then, the mixers 6292$c$ to 6292$f$ perform a second-stage frequency conversion. Namely, the input signal $f_{a1I}$ is allowed to undergo frequency conversion with a signal k2 by using the mixer 6292$c$, thereby generating a signal $f_{b1I}$. The signal $f_{b1I}$ is expressed by the following equation (9).

$$\begin{aligned} f_{b1I} &= [1/2(1/2)\cdot\{(e^{j(\omega+\omega 1)t}+e^{-j(\omega+\omega 1)t})+ \\ &\quad (e^{j(\omega-\omega 1)t}+e^{-j(\omega-\omega 1)t})\cdot(e^{j\omega 2t}+e^{-j\omega 2t})/2 \\ &= 1/4\{(e^{j(\omega+\omega 1+\omega 2)t}+e^{-j(\omega+\omega 1+\omega 2)t})+ \\ &\quad (e^{j(\omega-\omega 1+\omega 2)t}+e^{-j(\omega-\omega 1-\omega 2)t})+ \\ &\quad (e^{j(\omega+\omega 1-\omega 2)t}+e^{-j(\omega+\omega 1+\omega 2)t})+ \\ &\quad (e^{j(\omega-\omega 1-\omega 2)t}+e^{-j(\omega-\omega 1+\omega 2)t})\}/2 \\ &= (1/4)\{f(\omega+\omega 1+\omega 2)+f(\omega+\omega 1-\omega 2)+ \\ &\quad f(\omega-\omega 1+\omega 2)+f(\omega-\omega 1-\omega 2)\} \end{aligned} \tag{9}$$

Further, the signal $f_{a1I}$ is allowed to undergo frequency conversion with a signal k5 by using the mixer 6292$d$, thereby generating a signal $f_{b1Q}$. The signal $f_{b1Q}$ is expressed by the following equation (10).

$$\begin{aligned} f_{b1Q} &= [1/2(1/2)\cdot\{(e^{j(\omega+\omega 1)t}+e^{-j(\omega+\omega 1)t})+ \\ &\quad (e^{j(\omega-\omega 1)t}+e^{-j(\omega-\omega 1)t})\cdot(e^{j\omega 2t}-e^{-j\omega 2t})/2j \\ &= (1/4)\{(e^{j(\omega+\omega 1+\omega 2)t}+e^{-j(\omega+\omega 1+\omega 2)t})+ \\ &\quad (e^{j(\omega-\omega 1+\omega 2)t}+e^{-j(\omega-\omega 1-\omega 2)t})- \\ &\quad (e^{j(\omega+\omega 1-\omega 2)t}+e^{-j(\omega+\omega 1+\omega 2)t})- \\ &\quad (e^{j(\omega-\omega 1-\omega 2)t}+e^{-j(\omega-\omega 1+\omega 2)t})\}/2j \\ &= (1/4)\{f'(\omega+\omega 1+\omega 2)-f'(\omega+\omega 1-\omega 2)+ \\ &\quad f'(\omega-\omega 1+\omega 2)-f'(\omega-\omega 1-\omega 2)\} \end{aligned} \tag{10}$$

Still further, the signal $f_{a1Q}$ is allowed to undergo frequency conversion with a signal k2 by using the mixer 6292$e$, thereby generating a signal $f_{b2I}$. The signal $f_{b2I}$ is expressed by the following equation (11).

$$\begin{aligned} f_{b2I} &= [1/2(1/2j)\cdot\{(e^{j(\omega+\omega 1)t}-e^{-j(\omega+\omega 1)t})- \\ &\quad (e^{j(\omega-\omega 1)t}-e^{-j(\omega-\omega 1)t})\}\cdot(e^{j\omega 2t}+e^{-j\omega 2t})/2 \\ &= 1/4\{(e^{j(\omega+\omega 1+\omega 2)t}-e^{-j(\omega+\omega 1-\omega 2)t})- \\ &\quad (e^{j(\omega-\omega 1+\omega 2)t}-e^{-j(\omega-\omega 1-\omega 2)t})+ \\ &\quad (e^{j(\omega+\omega 1-\omega 2)t}-e^{-j(\omega+\omega 1+\omega 2)t})- \\ &\quad (e^{j(\omega-\omega 1-\omega 2)t}-e^{-j(\omega-\omega 1+\omega 2)t})\}/2j \\ &= (1/4)\{f'(\omega+\omega 1+\omega 2)+f'(\omega+\omega 1-\omega 2)- \\ &\quad f'(\omega-\omega 1+\omega 2)-f'(\omega-\omega 1-\omega 2)\} \end{aligned} \tag{11}$$

In addition, the signal $f_{a1Q}$ is allowed to undergo frequency conversion with a signal k5 by using the mixer 6292$f$, thereby generating a signal $f_{b2Q}$. The signal $f_{b2Q}$ is expressed by the following equation (12).

$$\begin{aligned} f_{b2Q} &= 1/2(1/2j)\cdot\begin{Bmatrix} (e^{j(\omega+\omega 1)t}-e^{-j(\omega+\omega 1)t})- \\ (e^{j(\omega-\omega 1)t}-e^{-j(\omega-\omega 1)t}) \end{Bmatrix}\cdot \\ &\quad (e^{j\omega 2t}-e^{-j\omega 2t})/2j \\ &= -\left(\frac{1}{4}\right)\begin{Bmatrix} (e^{j(\omega+\omega 1+\omega 2)t}-e^{-j(\omega+\omega 1-\omega 2)t})- \\ (e^{j(\omega-\omega 1+\omega 2)t}-e^{-j(\omega-\omega 1-\omega 2)t})- \\ (e^{j(\omega+\omega 1-\omega 2)t}-e^{-j(\omega+\omega 1+\omega 2)t})+ \\ (e^{j(\omega-\omega 1-\omega 2)t}-e^{-j(\omega-\omega 1+\omega 2)t}) \end{Bmatrix}\Big/2 \\ &= \left(\frac{1}{4}\right)\begin{Bmatrix} -f(\omega+\omega 1+\omega 2)+f(\omega+\omega 1-\omega 2)+ \\ f(\omega-\omega 1+\omega 2)-f(\omega-\omega 1-\omega 2) \end{Bmatrix} \end{aligned} \tag{12}$$

Herein, according to the equations (9) to (12), the second-stage frequency conversion generates four signals having the respective frequencies of "ω+ω1+ω2," "ω+ω1−ω2," "ω−ω1+ω2" and "ω−ω1−ω2."

Figure 24A:
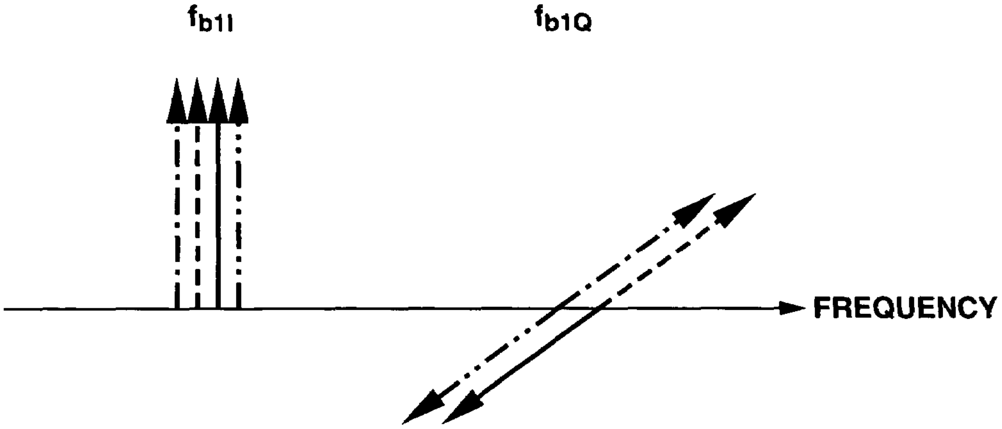
FIG. 24A and FIG. 24B are conceptual views illustrating the phase relationship between two signals generated from frequency conversion at the second stage in the exemplary modification of the present invention.
Figure 24B:
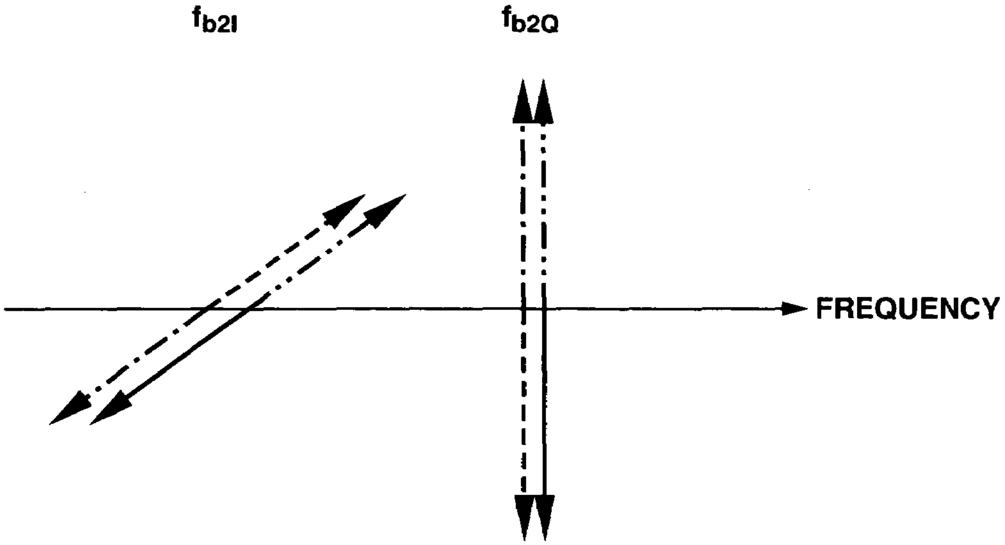

FIG. 24A to FIG. 24B and FIG. 25 are views illustrating concepts of relationship of signals generated by the second-stage frequency conversion. In FIG. 24A to FIG. 24B and FIG. 25, a desired signal of the frequency "ω−ω1−ω2" indicated by the solid line is a desired signal to be received, and signals having frequencies, "ω+ω1+ω2," "ω−ω1+ω2" and "ω+ω1−ω2," indicated by the dotted line, one-dot chain line and two-dot chain line are respectively image signals 1 to 3.

FIG. 24A to FIG. 24B are views illustrating phase-shift relationships of individual signals. FIG. 24A is a view illustrating a phase relationship between the signal $f_{b1I}$ and the signal $f_{b1Q}$ on the same frequency axis. FIG. 24B is a view illustrating a phase relationship between the signal $f_{b2I}$ and the signal $f_{b2Q}$ on the same frequency axis. As illustrated in FIG. 24A to FIG. 24B, the signal $f_{b1I}$ is orthogonal to the signal $f_{b1Q}$, and the signal $f_{b2I}$ is orthogonal to the signal $f_{b2Q}$.

Further, FIG. 25 is a view illustrating the frequency relationship of individual signals. As illustrated in the view, an image signal 1 of frequency "ω+ω1+ω2" is positioned symmetrical with respect to a signal to be received mainly at a frequency ω1 of signal k1, an image signal 2 of frequency "ω−ω1+ω2" is positioned symmetrical with respect to a desired image to be received mainly at a frequency ω2 of signal k2, and an image signal 3 of frequency "ω+ω1−ω2" is positioned symmetrical with respect to the image signal 1 mainly at a frequency $\omega 2_i$ positioned symmetrical with respect to the signal ω2 mainly at a frequency ω1.

Next, according the equations (9) through (12) and FIG. 24A through FIG. 24B, signals of individual frequencies can be taken out as follows. First, a signal f (ω−ω1−ω2) of frequency "ω−ω1−ω2" can be taken out as follows. Namely, a signal $f_{b2Q}$ is subtracted from a signal $f_{b1I}$. Further, a signal $f_{b1Q}$ is added to a signal $f_{b2I}$ and the phase is allowed to delay by 90 degrees. Then, these two signals are added to cancel signal components of other frequencies. Therefore, the signal f (ω−ω1−ω2) can be expressed by the following equation (13).

$$f(\omega-\omega 1-\omega 2)=f_{b1I}-f_{b2Q}+P(f_{b1Q}+f_{b2I}) \tag{13}$$

Additionally, in the above equation (13), the function P (f) is a function which allows a phase of the signal "f" to delay by 90 degrees.

Further, a signal f (ω+ω1+ω2) of frequency "ω+ω1+ω2" can be taken out as follows. Namely, a signal $f_{b2Q}$ is subtracted from a signal $f_{b1I}$. Further, a signal $f_{b1Q}$ is added to a signal $f_{b2Q}$ and the phase is allowed to advance by 90 degrees.

Then, these two signals are added to cancel signal components of other frequencies. Therefore, the signal f (ω+ω1+ω2) can be expressed by the following equation (14).

$$f(\omega+\omega1+\omega2)=f_{b1I}-f_{b2Q}-P(f_{b1Q}+f_{b2I}) \quad (14)$$

Still further, a signal f (ω−ω1+ω2) of frequency "ω−ω1+ 107 2" can be taken out as follows. Namely, a signal $f_{b1I}$ is added to a signal $f_{b2Q}$. Further, a signal $f_{b2I}$ is subtracted from a signal $f_{b1Q}$ and the phase is allowed to advance by 90 degrees. Then, these two signals are added to cancel signal components of other frequencies. Therefore, the signal f (ω−ω1+ω2) can be expressed by the following equation (15).

$$\begin{aligned} f(\omega-\omega1+\omega2 &= f_{b1I}+f_{b2Q}+P(-f_{b1Q}+f_{b2I}) \quad (15)\\ &= f_{b1I}+f_{b2Q}-P(f_{b1Q}-f_{b2I}) \end{aligned}$$

In addition, a signal f (ω+ω1−ω2) of frequency "ω+ω1−ω2" can be taken out as follows. Namely, a signal $f_{b1I}$ is added to a signal $f_{b2Q}$. Further, a signal $f_{b2I}$ is subtracted from a signal $f_{b1Q}$ and the phase is allowed to delay by 90 degrees. Then, these two signals are added to cancel signal components of other frequencies. Therefore, the signal f (ω+ω1−ω2) can be expressed by the following equation (16).

$$f(\omega+\omega1-\omega2)=f_{b1I}+f_{b2Q}+P(f_{b1Q}-f_{b2I}) \quad (16)$$

These equations (13) through (16) can decide the respective operational contents (addition/subtraction) of adders-subtractors 6294*a* to 6294*d* as illustrated in FIG. 26. Namely, the addition/subtraction by the respective first halves of the equations (13) to (16) can decide operational contents of the adder-subtractor 6294*a*, while the addition/subtraction by the respective latter halves can decide operational contents of the adder-subtractor 6294*b*. Further, the respective 90-degree phase shifts (advance/delay) of the equations (13) to (16) as well as the addition/subtraction by the first halves and the latter halves can decide the respective operational contents of the adders-subtractors 6294*c* and 6294*d*.

Next, according to the table in FIG. 26, the adder-subtractor 6294*a* generates a signal $f_d$ by making synthesis by adding a signal $f_{b1I}$ to a signal $f_{b2Q}$ or a signal $f_c$ by making synthesis by subtracting a signal $f_{b2Q}$ from a signal $f_{b1I}$. The signal $f_d$ is expressed by the following equation (17), and the signal $f_c$ is expressed by the following equation (18).

$$\begin{aligned} f_d &= f_{b1I}+f_{b2Q} \quad (17)\\ &= (1/2)\left\{\begin{matrix} (e^{j(\omega+\omega1-\omega2)t}+e^{-j(\omega+\omega1-\omega2)t})+\\ (e^{j(\omega-\omega1+\omega2)}+e^{-j(\omega-\omega1+\omega2)t}) \end{matrix}\right\}\Big/2 \end{aligned}$$

$$\begin{aligned} f_c &= f_{b1I}-f_{b2Q} \quad (18)\\ &= (1/2)\left\{\begin{matrix} (e^{j(\omega+\omega1+\omega2)t}+e^{-j(\omega+\omega1+\omega2)t})+\\ (e^{j(\omega-\omega1-\omega2)t}+e^{-j(\omega-\omega1-\omega2)t}) \end{matrix}\right\}\Big/2 \end{aligned}$$

Further, the adder-subtractor 6294*b* generates a signal $f_g$ by making synthesis by adding a signal $f_{b1Q}$ to a signal $f_{b2I}$ or a signal $f_e$ by making synthesis by subtracting a signal $f_{b2I}$ from a signal $f_{b1Q}$. The signal $f_g$ is expressed by the following equation (19), and the signal $f_e$ is expressed by the following equation (20).

$$\begin{aligned} f_g &= f_{b1Q}+f_{b2I} \quad (19)\\ &= (1/2)\left\{\begin{matrix} (e^{j(\omega+\omega1+\omega2)t}-e^{-j(\omega+\omega1+\omega2)t})-\\ (e^{j(\omega-\omega1-\omega2)t}-e^{-j(\omega-\omega1-\omega2)t}) \end{matrix}\right\}\Big/2j \end{aligned}$$

$$\begin{aligned} f_e &= f_{b1Q}-f_{b2I} \quad (20)\\ &= (1/2)\left\{\begin{matrix} (e^{j(\omega+\omega1+\omega2)t}-e^{-j(\omega+\omega1+\omega2)t})+\\ (e^{j(\omega-\omega1-\omega2)t}-e^{-j(\omega-\omega1-\omega2)t}) \end{matrix}\right\}\Big/2j \end{aligned}$$

Next, mixers 6292*g* to 6292*j* perform a third-stage frequency conversion. Namely, the mixer 6292*g* generates a signal $f_{cI3}$ by allowing a signal $f_c$ to undergo frequency conversion with a signal k3 or a signal $f_{dI3}$ by allowing a signal $f_d$ to undergo frequency conversion with a signal k3. The signal $f_{cI3}$ is expressed by the following equation (21), and signal $f_{dI3}$ is expressed by the following equation (22).

$$\begin{aligned} f_{cI3} &= (f_{b1I}-f_{b2Q})\cdot(e^{j\omega3t}+e^{-j\omega3t})/2 \quad (21)\\ &= \{(e^{j(\omega+\omega1+\omega2+\omega3)t}+e^{-j(\omega-\omega1-\omega2-\omega3)t})+\\ &\quad (e^{j(\omega-\omega1-\omega2+\omega3)t}+e^{-j(\omega-\omega1-\omega2-\omega3)t})+\\ &\quad (e^{j(\omega+\omega1+\omega2-\omega3)t}+e^{-j(\omega+\omega1+\omega2+\omega3)t})+\\ &\quad (e^{j(\omega-\omega1-\omega2-\omega3)t}+e^{-j(\omega-\omega1-\omega2-\omega3)t})/8\\ &= (1/4)\{f(\omega+\omega1+\omega2+\omega3)+f(\omega+\omega1+\omega2-\omega3)+\\ &\quad f(\omega+\omega1+\omega2+\omega3)+f(\omega+\omega1+\omega2-\omega3)+\\ &\quad f(\omega-\omega1-\omega2+\omega3)+f(\omega-\omega1-\omega2-\omega3)\} \end{aligned}$$

$$\begin{aligned} f_{dI3} &= (f_{b1I}+f_{b2Q})\cdot(e^{j\omega3t}+e^{-j\omega3t})/2 \quad (22)\\ &= \{(e^{j(\omega+\omega1-\omega2+\omega3)t}+e^{-j(\omega+\omega1-\omega2-\omega3)t})+\\ &\quad (e^{j(\omega-\omega1+\omega2+\omega3)t}+e^{-j(\omega-\omega1+\omega2-\omega3)t})+\\ &\quad (e^{j(\omega+\omega1-\omega2-\omega3)t}+e^{-j(\omega+\omega1-\omega2+\omega3)t})+\\ &\quad (e^{j(\omega-\omega1+\omega2-\omega3)t}+e^{-j(\omega-\omega1+\omega2+\omega3)t})/8\\ &= (1/4)\{f(\omega+\omega1-\omega2+\omega3)+f(\omega+\omega1-\omega2-\omega3)+\\ &\quad f(\omega-\omega1+\omega2+\omega3)+f(\omega-\omega1+\omega2-\omega3)\} \end{aligned}$$

Further, the mixer 6292*h* generates a signal $f_{eQ3}$ by allowing a signal $f_e$ to undergo frequency conversion with a signal k6 or a signal $f_{gQ3}$ by allowing a signal $f_g$ to undergo frequency conversion with a signal k6. The signal $f_{eQ3}$ is expressed by the following equation (20), and signal $f_{gQ3}$ is expressed by the following equation (24).

$$\begin{aligned} f_{eQ3} &= (f_{b1Q}-f_{b2I})\cdot(e^{j\omega3t}-e^{-j\omega3t})/2j \quad (23)\\ &= -\{(e^{j(\omega+\omega1-\omega2+\omega3)t}-e^{-j(\omega+\omega1-\omega2-\omega3)t})+\\ &\quad (e^{j(\omega-\omega1+\omega2+\omega3)t}-e^{-j(\omega-\omega1+\omega2-\omega3)t})+\\ &\quad (-e^{j(\omega+\omega1-\omega2+\omega3)t}+e^{-j(\omega+\omega1-\omega2-\omega3)t})+\\ &\quad (-e^{j(\omega-\omega1+\omega2-\omega3)t}+e^{-j(\omega-\omega1+\omega2+\omega3)t})/8\\ &= (1/4)\{-f(\omega+\omega1-\omega2+\omega3)+\\ &\quad f(\omega+\omega1-\omega2-\omega3)-f(\omega-\omega1+\omega2+\omega3)+\\ &\quad f(\omega-\omega1+\omega2-\omega3)\} \end{aligned}$$

-continued $$\begin{aligned} f_{gQ3} &= (f_{b1Q} + f_{b2I}) \cdot (e^{j\omega 3t} - e^{-j\omega 3t})/2j \\ &= -\{(e^{j(\omega+\omega 1+\omega 2+\omega 3)t} - e^{-j(\omega+\omega 1+\omega 2-\omega 3)t}) - \\ &\quad (e^{j(\omega-\omega 1-\omega 2+\omega 3)t} - e^{-j(\omega-\omega 1-\omega 2-\omega 3)t}) + \\ &\quad (-e^{j(\omega+\omega 1+\omega 2-\omega 3)t} + e^{-j(\omega+\omega 1+\omega 2+\omega 3)t}) - \\ &\quad (-e^{j(\omega-\omega 1+\omega 2-\omega 3)t} + e^{-j(\omega-\omega 1+\omega 2+\omega 3)t})/8 \\ &= (1/4)\{-f(\omega + \omega 1 + \omega 2 + \omega 3) + \\ &\quad f(\omega + \omega 1 + \omega 2 - \omega 3) + f(\omega - \omega 1 - \omega 2 + \omega 3) - \\ &\quad f(\omega - \omega 1 - \omega 2 - \omega 3)\} \end{aligned} \tag{24}$$

Still further, the mixer 6292*i* generates a signal $f_{eI3}$ by allowing a signal $f_e$ to undergo frequency conversion with a signal k3 or a signal $f_{gI3}$ by allowing a signal $f_g$ to undergo frequency conversion with a signal k3. The signal $f_{eI3}$ is expressed by the following equation (25), and signal $f_{gI3}$ is expressed by the following equation (26).

$$\begin{aligned} f_{eI3} &= (f_{b1Q} - f_{b2I}) \cdot (e^{j\omega 3t} + e^{-j\omega 3t})/2 \\ &= \{(e^{j(\omega+\omega 1-\omega 2+\omega 3)t} - e^{-j(\omega+\omega 1+\omega 2-\omega 3)t}) + \\ &\quad (e^{j(\omega-\omega 1+\omega 2+\omega 3)t} - e^{-j(\omega-\omega 1+\omega 2-\omega 3)t}) + \\ &\quad (-e^{j(\omega+\omega 1-\omega 2-\omega 3)t} + e^{-j(\omega+\omega 1-\omega 2+\omega 3)t}) + \\ &\quad (-e^{j(\omega-\omega 1+\omega 2-\omega 3)t} + e^{-j(\omega-\omega 1+\omega 2+\omega 3)t})/8j \\ &= (1/4)\{-f'(\omega + \omega 1 - \omega 2 + \omega 3) + \\ &\quad f'(\omega + \omega 1 - \omega 2 - \omega 3) - f'(\omega - \omega 1 + \omega 2 + \omega 3) + \\ &\quad f'(\omega - \omega 1 + \omega 2 - \omega 3)\} \end{aligned} \tag{25}$$

$$\begin{aligned} f_{gI3} &= (f_{b1Q} + f_{b2I}) \cdot (e^{j\omega 3t} + e^{-j\omega 3t})/2 \\ &= \{(e^{j(\omega+\omega 1+\omega 2+\omega 3)t} - e^{-j(\omega+\omega 1+\omega 2-\omega 3)t}) - \\ &\quad (e^{j(\omega-\omega 1-\omega 2+\omega 3)t} - e^{-j(\omega-\omega 1-\omega 2-\omega 3)t}) + \\ &\quad (-e^{j(\omega+\omega 1+\omega 2-\omega 3)t} + e^{-j(\omega+\omega 1+\omega 2+\omega 3)t}) - \\ &\quad (-e^{j(\omega-\omega 1-\omega 2-\omega 3)t} + e^{-j(\omega-\omega 1-\omega 2+\omega 3)t})/8j \\ &= (1/4)\{f'(\omega + \omega 1 + \omega 2 + \omega 3) + \\ &\quad f'(\omega + \omega 1 + \omega 2 - \omega 3) - f'(\omega - \omega 1 - \omega 2 + \omega 3) - \\ &\quad f'(\omega - \omega 1 - \omega 2 - \omega 3)\} \end{aligned} \tag{26}$$

In addition, the mixer 6292*j* generates a signal $f_{cQ3}$ by allowing a signal $f_c$ to undergo frequency conversion with a signal k6 or a signal $f_{dQ3}$ by allowing a signal $f_d$ to undergo frequency conversion with a signal k6. The signal $f_{cQ3}$ is expressed by the following equation (27), and signal $f_{dQ3}$ is expressed by the following equation (28).

$$\begin{aligned} f_{cQ3} &= (f_{b1Q} - f_{b2I}) \cdot (e^{j\omega 3t} - e^{-j\omega 3t})/2j \\ &= \{(e^{j(\omega+\omega 1+\omega 2+\omega 3)t} - e^{-j(\omega+\omega 1+\omega 2-\omega 3)t}) + \\ &\quad (e^{j(\omega-\omega 1-\omega 2+\omega 3)t} - e^{-j(\omega-\omega 1-\omega 2-\omega 3)t}) + \\ &\quad (-e^{j(\omega+\omega 1+\omega 2-\omega 3)t} + e^{-j(\omega+\omega 1+\omega 2+\omega 3)t}) + \\ &\quad (-e^{j(\omega-\omega 1-\omega 2-\omega 3)t} + e^{-j(\omega-\omega 1-\omega 2+\omega 3)t})/8j \\ &= (1/4)\{f'(\omega + \omega 1 + \omega 2 + \omega 3) - \\ &\quad f'(\omega + \omega 1 + \omega 2 - \omega 3) + f'(\omega - \omega 1 - \omega 2 + \omega 3) - \\ &\quad f'(\omega - \omega 1 - \omega 2 - \omega 3)\} \end{aligned} \tag{27}$$

-continued $$\begin{aligned} f_{dQ3} &= (f_{b1I} - f_{b2Q}) \cdot (e^{j\omega 3t} - e^{-j\omega 3t})/2j \\ &= \{(e^{j(\omega+\omega 1-\omega 2+\omega 3)t} + e^{-j(\omega+\omega 1-\omega 2-\omega 3)t}) + \\ &\quad (e^{j(\omega-\omega 1+\omega 2+\omega 3)t} + e^{-j(\omega-\omega 1+\omega 2-\omega 3)t}) + \\ &\quad (-e^{j(\omega+\omega 1-\omega 2-\omega 3)t} - e^{-j(\omega+\omega 1-\omega 2+\omega 3)t}) + \\ &\quad (-e^{j(\omega-\omega 1+\omega 2-\omega 3)t} - e^{-j(\omega-\omega 1+\omega 2+\omega 3)t})/8j \\ &= (1/4)\{f'(\omega + \omega 1 - \omega 2 + \omega 3) - \\ &\quad f'(\omega + \omega 1 - \omega 2 - \omega 3) + f'(\omega - \omega 1 + \omega 2 + \omega 3) - \\ &\quad f'(\omega - \omega 1 + \omega 2 - \omega 3)\} \end{aligned} \tag{28}$$

Then, the adder-subtractor 6294*c* generates a signal $f_{h1}$ by making synthesis by adding a signal $f_{cI3}$ to a signal $f_{gQ3}$, a signal $f_{h2}$ by making synthesis by subtracting a signal $f_{gQ3}$ from a signal $f_{cI3}$, a signal $f_{h3}$ by making synthesis by adding a signal $f_{dI3}$ to a signal $f_{eQ3}$, or a signal $f_{h4}$ by making synthesis by subtracting a signal $f_{eQ3}$ from a signal $f_{dI3}$. The signal $f_{h1}$ is expressed by the following equation (29a), the signal $f_{h2}$ by the following equation (29b), signal $f_{h3}$ by the following equation (29c) and the signal $f_{h4}$ by the following equation (29d).

$$\begin{aligned} f_{h1} &= f_{cI3} + f_{gQ3} \\ &= (1/2)\{f(\omega + \omega 1 + \omega 2 - \omega 3) + \\ &\quad f(\omega - \omega 1 - \omega 2 + \omega 3)\} \end{aligned} \tag{29a}$$

$$\begin{aligned} f_{h2} &= f_{cI3} - f_{gQ3} \\ &= (1/2)\{f(\omega + \omega 1 + \omega 2 + \omega 3) + \\ &\quad f(\omega - \omega 1 - \omega 2 - \omega 3)\} \end{aligned} \tag{29b}$$

$$\begin{aligned} f_{h3} &= f_{dI3} + f_{eQ3} \\ &= (1/2)\{f(\omega + \omega 1 - \omega 2 - \omega 3) + \\ &\quad f(\omega - \omega 1 + \omega 2 - \omega 3)\} \end{aligned} \tag{29c}$$

$$\begin{aligned} f_{h4} &= f_{dI3} - f_{eQ3} \\ &\quad (1/2)\{f(\omega + \omega 1 - \omega 2 + \omega 3) + \\ &\quad f(\omega - \omega 1 + \omega 2 + \omega 3)\} \end{aligned} \tag{29d}$$

Further, the adder-subtractor 6294*d* generates a signal $f_{i1}$ by making synthesis by adding a signal $f_{cQ3}$ to a signal $f_{gI3}$, a signal $f_{i2}$ by making synthesis by subtracting a signal $f_{gI3}$ from a signal $f_{cQ3}$, a signal $f_{i3}$ by making synthesis by adding a signal $f_{dQ3}$ to a signal $f_{eI3}$, or a signal $f_{i4}$ by making synthesis by subtracting a signal $f_{eI3}$ from a signal $f_{dQ3}$. The signal $f_{i1}$ is expressed by the following equation (30a), the signal $f_{i2}$ by the following equation (30b), signal $f_{i3}$ by the following equation (30c) and the signal $f_{i4}$ by the following equation (30d)

$$\begin{aligned} f_{i1} &= f_{cQ3} + f_{gI3} \\ &= (1/2)\{f'(\omega + \omega 1 + \omega 2 + \omega 3) - \\ &\quad f'(\omega - \omega 1 - \omega 2 - \omega 3)\} \end{aligned} \tag{30a}$$

$$\begin{aligned} f_{i2} &= f_{cQ3} - f_{gI3} \\ &= (1/2)\{-f'(\omega + \omega 1 + \omega 2 - \omega 3) + \\ &\quad f'(\omega - \omega 1 - \omega 2 + \omega 3)\} \end{aligned} \tag{30b}$$

$$\begin{aligned} f_{i3} &= f_{dQ3} + f_{eI3} \\ &= (1/2)\{f'(\omega + \omega 1 - \omega 2 + \omega 3) + \\ &\quad f'(\omega - \omega 1 + \omega 2 + \omega 3)\} \end{aligned} \tag{30c}$$

-continued $$f_{i4} = f_{dQ3} - f_{eI3} \quad (30d)$$
$$(1/2)\{-f'(\omega + \omega 1 - \omega 2 - \omega 3) -$$
$$-f'(\omega - \omega 1 + \omega 2 - \omega 3)\}$$

In this case, in order to take out desired signals to be received, the adders-subtractors 6294*a* and 6294*d* are used to make subtraction/synthesis, and the adders-subtractors 6294*b* and 6294*c* are used to make addition/synthesis. Then, the adder-subtractor 6294*a* outputs a signal $f_c$ expressed by the equation (18), the adder-subtractor 6294*b* outputs a signal $f_g$ expressed by the equation (19), the adder-subtractor 6294*c* outputs a signal $f_{h1}$ expressed by the equation (29a) and the adder-subtractor 6294*d* outputs a signal $f_{i2}$ expressed by the equation (30b).

Next, according to these equations (29a) and (30b), a frequency ω, which satisfies the following equation (31a) or (31b) is given as a received frequency. Therefore, the received frequency ω is expressed by the following equation (32a) or (32b).

$$\omega+\omega1+\omega2-\omega3=0 \quad (31a)$$

$$\omega-\omega1-\omega2+\omega3=0 \quad (31b)$$

$$\omega=\omega1+\omega2-\omega3 \quad (32a)$$

$$\omega=-(\omega1+\omega2-\omega3) \quad (32b)$$

Further, a signal "d" output from an adder 6295 is expressed by the following equation (33).

$$\begin{aligned} d &= (f_{cI3} + f_{gQ3})^2 + (f_{cQ3} - f_{gI3})^2 \quad (33) \\ &= \{(e^{j(\omega+\omega1+\omega2-\omega3)t} + e^{-j(\omega+\omega1+\omega2-\omega3)t}) + (e^{j(\omega-\omega1-\omega2+\omega3)t} + e^{-j(\omega-\omega1-\omega2+\omega3)t})/2\}^2 + \\ &\quad \{(e^{j(\omega+\omega1+\omega2-\omega3)t} - e^{-j(\omega+\omega1+\omega2-\omega3)t}) - (e^{j(\omega-\omega1-\omega2+\omega3)t} - e^{-j(\omega-\omega1-\omega2+\omega3)t})/2j\}^2 \\ &= \{\cos(\omega + \omega1 + \omega2 - \omega3)t + \cos(\omega - \omega1 - \omega2 + \omega3)t\}^2 + \sin(\omega + \omega1 + \omega2 - \omega3)t - \\ &\quad \sin(\omega - \omega1 - \omega2 + \omega3)t\}^2 \\ &= 2 + 2\cos(\omega + \omega1 + \omega2 - \omega3)t \cdot \cos(\omega - \omega1 - \omega2 + \omega3)t - 2\sin(\omega + \omega1 + \omega2 - \omega3)t \cdot \\ &\quad \sin(\omega - \omega1 - \omega2 + \omega3)t \\ &= 2 + 2\cos 2\omega t \end{aligned}$$

Then, the signal "d" is passed through a predetermined LPF (not illustrated) to cut off high frequency components, and a final output signal "d" is to give d=2, thereby to make it possible to take out only a signal level.

In the multi-stage frequency conversion circuit 629G of FIG. 22, a three-stage frequency conversion is performed by using three frequency-divided signals k1 to k3 different in frequency. However, a four or more stage frequency conversion may be performed. In this case, partial circuits 624G including the mixers 6292*g* to 6292*j* as well as adders-subtractors 6294*c* and 6294*d* are provided in any desired number according to the number of stages of frequency conversion to input a frequency-divided signal "k" into individual stages.

According to a constitution in which a detection circuit 626 is included in the multi-stage frequency conversion circuit 623 as illustrated in FIG. 21 and FIG. 22, local oscillating circuits or PLL circuits required in a conventional radio wave receiving apparatus based on a super-heterodyne system are not necessary. It is, therefore, possible to receive signals in a stable manner and reduce electric power consumption as a whole system. Further, received signals are allowed to undergo a multi-stage frequency conversion based on a plurality of frequency-divided signals, thereby to make it possible to receive the signals at a high accuracy.

Further, when received signals are allowed to undergo a multi-stage frequency conversion based on frequency-divided signals, image signal components resulting from the frequency conversion are removed. Namely, the received signals are multiplied respectively by a first frequency-divided signal and a first dividing phase-shift signal to perform a first-stage frequency conversion. Then, a first I signal and a first Q signal generated by the first frequency conversion are respectively multiplied by a second frequency-divided signal and a second dividing phase-shift signal to perform a second-stage frequency conversion. A second I signal and a third Q signal thus generated are respectively added to or subtracted from a second Q signal and a third I signal to remove image signal components resulting from the first-stage and the second-stage frequency conversions. Then, each of the first and the second synthesized signals generated by the second frequency conversion is multiplied by each of the third frequency-divided signal and the third dividing phase-shift signal to perform a third-stage frequency conversion. Then, each of the fourth I signal and the fourth Q signal thus generated is added to or subtracted from each of the fifth I signal and the fifth Q signal to remove image signal components resulting from a third-stage frequency conversion.

In the embodiments described above, an explanation was made for a case in which the present invention was applied to a radio wave timepiece for receiving standard radio waves. However, the present invention is applicable to other radio wave receiving apparatuses.

Further, in the embodiments described above, an explanation was made for a case in which a reference frequency signal bs was given as a signal having the frequency of 32.768 kHz. As a matter of course, other frequencies may be applicable in a similar manner.

What is claimed is:

1. A radio wave receiving apparatus comprising:

an amplification section which amplifies a signal received by an antenna;

a reference-frequency output section which outputs a reference frequency signal with a predetermined frequency;

a frequency-dividing section which frequency-divides the reference frequency signal output from the reference-frequency output section or a signal obtained by multiplying the frequency of the reference frequency signal by a plurality of frequency-dividing ratios, and which outputs a plurality of the frequency-divided signals;

a multi-stage frequency conversion section in which a plurality of conversion circuits are connected serially, wherein the plurality of conversion circuits output signals obtained by converting frequencies of input signals based on the frequency-divided signals output from the frequency-dividing section, as conversion signals, and wherein the received signal amplified by the amplification section is supplied to a first stage of the conversion circuits as an input signal; and a detection section which detects a conversion signal output from a final stage of the conversion circuits in the multi-stage frequency conversion section by using, as a reference signal, any one of the frequency-divided signals from the frequency-dividing section.

2. The radio wave receiving apparatus as claimed in claim 1, wherein the detection section comprises:

a first multiplication unit which multiplies the conversion signal by the reference signal;

a first square unit which squares a signal multiplied by the first multiplication unit;

a phase shift unit which performs a 90-degree phase shift for the reference signal;

a second multiplication unit which multiplies the conversion signal by a signal phase-shifted by the phase shift unit;

a second square unit which squares a signal multiplied by the second multiplication unit; and an addition unit which adds a signal squared by the first square unit to a signal squared by the second square unit.

3. The radio wave receiving apparatus as claimed in claim 1, wherein the detection section detects a conversion signal output from a stage just before the final stage in the multi-stage frequency conversion section, by using a frequency-divided signal output from the frequency-dividing section as a reference signal.

4. The radio wave receiving apparatus as claimed in claim 1, wherein each of the conversion circuits of the multi-stage frequency conversion section comprises:

a multiplication unit which multiplies an input signal by a frequency-divided signal, and a filter unit which extracts a signal with a predetermined band from signals multiplied by the multiplication unit, and which outputs the extracted signal as a conversion signal.

5. The radio wave receiving apparatus as claimed in claim 1, wherein each of the conversion circuits of the multi-stage frequency conversion section comprises:

a multiplication unit which multiplies an input signal by a frequency-divided signal, and a filter unit which selects one pass band from a plurality of predetermined pass bands, and which outputs an extracted signal as a conversion signal.

6. The radio wave receiving apparatus as claimed in claim 1, wherein each of the conversion circuits of the multi-stage frequency conversion section comprises a switch output unit which outputs a first input signal as a conversion signal, without conversion of frequency depending on switching conditions.

7. The radio wave receiving apparatus as claimed in claim 1, further comprising a selection section which selects a frequency-divided signal to be input into individual conversion circuits of the multi-stage frequency conversion section from the frequency-divided signals output by the frequency-dividing section.

8. The radio wave receiving apparatus as claimed in claim 1, wherein each of the conversion circuits of the multi-stage frequency conversion section comprises:

a third multiplication unit which multiplies an input signal by a frequency-divided signal;

a first phase shift unit which performs a 90-degree phase shift for the frequency-divided signal;

a fourth multiplication unit which multiplies the input signal by a signal phase-shifted by the first phase shift unit;

a second phase-shift unit which performs a phase shift for at least one of two signals multiplied by the third multiplication unit and the fourth multiplication unit, to give a 90-degree phase shift difference with respect to the two signals, respectively; and an addition or subtraction unit which adds or subtracts the two signals at least one of which is phase-shifted by the second phase shift unit, to output the added or extracted signal as a conversion signal.

9. The radio wave receiving apparatus as claimed in claim 1, wherein the multi-stage frequency conversion section comprises:

a first phase-shift unit, a second phase-shift unit and a third phase-shift unit which perform a 90-degree phase shift for a first frequency-divided signal, a second frequency-divided signal and a third frequency-divided signal among the plurality of frequency-divided signals output by the frequency-dividing section, and which output a first frequency-divided phase-shift signal, a second frequency-divided phase-shift signal and a third frequency-divided phase-shift signal, respectively;

a first-stage processing unit which generates and outputs a first I signal and a first Q signal, by multiplying the amplified received signal by the first frequency-divided signal and the first frequency-divided phase-shift signal, respectively, to perform frequency conversion for the received signal;

a first IQ signal processing unit which generates and outputs a second I signal and a second Q signal, obtained by multiplying the first I signal and the first Q signal by the second frequency-divided signal and the second frequency-divided phase-shift signal, respectively, to perform frequency conversion to the first I signal with the second frequency-divided signal, and to perform frequency conversion to the first I signal with the second frequency-divided phase-shift signal, and a third I signal and a third Q signal, obtained by performing frequency conversion to the first Q signal with the second frequency-divided signal, and performing frequency conversion to the first Q signal with the second frequency-divided phase-shift signal;

a first synthesis unit which adds or subtracts the second I signal to or from the third Q signal, thereby to generate and output a first synthesis signal;

a second synthesis unit which adds or subtracts the second Q signal to or from the third I signal, thereby to generate and output a second synthesis signal;

a second IQ signal processing unit which generates and outputs a fourth I signal and a fourth Q signal, obtained by multiplying the first synthesis signal and the second synthesis signal by the third frequency-divided signal and the third frequency-divided phase-shift signal, respectively, to perform frequency conversion to the first synthesis signal with the third frequency-divided signal, and to perform frequency conversion to the first synthesis signal with the third frequency-divided phase-shift signal, and a fifth I signal and a fifth Q signal, obtained by performing frequency conversion to the second synthesis signal with the third frequency-divided signal, and performing frequency conversion to the second synthesis signal with the third frequency-divided phase-shift signal;

a third synthesis unit which adds or subtracts the fourth I signal to or from the fourth Q signal, thereby to generate and output a third synthesis signal;

a fourth synthesis unit which adds or subtracts the fifth I signal to or from the fifth Q signal, thereby to generate and output a fourth synthesis signal; and a subsequent-stage processing unit which calculates and outputs a sum of squares of the third synthesis signal and the fourth synthesis signal.

10. A radio wave receiving circuit comprising:

an amplification circuit which amplifies a signal received by an antenna;

a reference-frequency output circuit which outputs a reference frequency signal with a predetermined frequency;

a frequency-dividing circuit which frequency-divides the reference frequency signal output from the reference-frequency output circuit or a signal obtained by multiplying the frequency of the reference frequency signal by a plurality of frequency-dividing ratios, and which outputs a plurality of the frequency-divided signals;

a multi-stage frequency conversion circuit in which a plurality of conversion circuits are connected serially, wherein the plurality of conversion circuits output signals obtained by converting frequencies of input signals based on the frequency-divided signals output from the frequency-dividing circuit, as conversion signals, and wherein the received signal amplified by the amplification circuit is supplied to a first stage of the conversion circuits as an input signal; and a detection circuit which detects a conversion signal output from a final stage of the conversion circuits in the multi-stage frequency conversion circuit by using, as a reference signal, any one of the frequency-divided signals from the frequency-dividing circuit.

11. The radio wave receiving circuit as claimed in claim 10, wherein the detection circuit comprises:

a first multiplication circuit which multiplies the conversion signal by the reference signal;

a first square circuit which squares a signal multiplied by the first multiplication circuit;

a phase shift circuit which performs a 90-degree phase shift for the reference signal;

a second multiplication circuit which multiplies the conversion signal by a signal phase-shifted by the phase shift circuit;

a second square circuit which squares a signal multiplied by the second multiplication circuit; and an addition circuit which adds a signal squared by the first square circuit to a signal squared by the second square circuit.

12. The radio wave receiving circuit as claimed in claim 10, wherein the detection circuit detects a conversion signal output from a stage just before the final stage in the multi-stage frequency conversion circuit, by using a frequency-divided signal output from the frequency-dividing circuit as a reference signal.

13. The radio wave receiving circuit as claimed in claim 10, wherein each of the conversion circuits of the multi-stage frequency conversion circuit comprises:

a multiplication circuit which multiplies an input signal by a frequency-divided signal, and a filter circuit which extracts a signal with a predetermined band from signals multiplied by the multiplication circuit, and which outputs the extracted signal as a conversion signal.

14. The radio wave receiving circuit as claimed in claim 10, wherein each of the conversion circuits of the multi-stage frequency conversion circuit comprises:

a multiplication circuit which multiplies an input signal by a frequency-divided signal, and a filter circuit which selects one pass band from a plurality of predetermined pass bands, and which outputs an extracted signal as a conversion signal.

15. The radio wave receiving circuit as claimed in claim 10, wherein each of the conversion circuits of the multi-stage frequency conversion circuit comprises a switch output circuit which outputs a first input signal as a conversion signal, without conversion of frequency depending on switching conditions.

16. The radio wave receiving circuit as claimed in claim 10, further comprising a selection circuit which selects a frequency-divided signal to be input into individual conversion circuits of the multi-stage frequency conversion circuit from the frequency-divided signals output by the frequency-dividing circuit.

17. The radio wave receiving circuit as claimed in claim 10, wherein each of the conversion circuits of the multi-stage frequency conversion circuit comprises:

a third multiplication circuit which multiplies an input signal by a frequency-divided signal;

a first phase shift circuit which performs a 90-degree phase shift for the frequency-divided signal;

a fourth multiplication circuit which multiplies the input signal by a signal phase-shifted by the first phase shift circuit;

a second phase-shift circuit, which performs a phase shift for at least one of two signals multiplied by the third multiplication circuit and the fourth multiplication circuit, to give a 90-degree phase shift difference with respect to the two signals, respectively; and an addition or subtraction circuit which adds or subtracts the two signals at least one of which is phase-shifted by the second phase shift circuit, to output the added or extracted signal as a conversion signal.

18. The radio wave receiving circuit as claimed in claim 10, wherein the multi-stage frequency conversion circuit comprises:

a first phase-shift circuit, a second phase-shift circuit and a third phase-shift circuit which perform a 90-degree phase shift for a first frequency-divided signal, a second frequency-divided signal and a third frequency-divided signal among the plurality of frequency-divided signals output by the frequency-dividing circuit, and which output a first frequency-divided phase-shift signal, a second frequency-divided phase-shift signal and a third frequency-divided phase-shift signal, respectively;

a first-stage processing circuit which generates and outputs a first I signal and a first Q signal, by multiplying the amplified received signal by the first frequency-divided signal and the first frequency-divided phase-shift signal, respectively, to perform frequency conversion for the received signal;

a first IQ signal processing circuit which generates and outputs a second I signal and a second Q signal, obtained by multiplying the first I signal and the first Q signal by the second frequency-divided signal and the second frequency-divided phase-shift signal, respectively, to perform frequency conversion to the first I signal with the second frequency-divided signal, and to perform frequency conversion to the first I signal with the second frequency-divided phase-shift signal, and a third I signal and a third Q signal, obtained by performing frequency conversion to the first Q signal with the second frequency-divided signal, and performing frequency conversion to the first Q signal with the second frequency-divided phase-shift signal;

a first synthesis circuit which adds or subtracts the second I signal to or from the third Q signal, thereby to generate and output a first synthesis signal;

a second synthesis circuit which adds or subtracts the second Q signal to or from the third I signal, thereby to generate and output a second synthesis signal;

a second IQ signal processing circuit which generates and outputs a fourth I signal and a fourth Q signal, obtained by multiplying the first synthesis signal and the second synthesis signal by the third frequency-divided signal and the third frequency-divided phase-shift signal, respectively, to perform frequency conversion to the first synthesis signal with the third frequency-divided signal, and to perform frequency conversion to the first synthesis signal with the third frequency-divided phase-shift signal, and a fifth I signal and a fifth Q signal, obtained by performing frequency conversion to the second synthesis signal with the third frequency-divided signal, and performing frequency conversion to the second synthesis signal with the third frequency-divided phase-shift signal;

a third synthesis circuit which adds or subtracts the fourth I signal to or from the fourth Q signal, thereby to generate and output a third synthesis signal;

a fourth synthesis circuit which adds or subtracts the fifth I signal to or from the fifth Q signal, thereby to generate and output a fourth synthesis signal; and a subsequent-stage processing circuit which calculates and outputs a sum of squares of the third synthesis signal and the fourth synthesis signal.

19. A radio wave timepiece comprising:

an amplification section which amplifies a signal of standard radio waves including time information, received by an antenna;

a reference-frequency output section which outputs a reference frequency signal with a predetermined frequency;

a frequency-dividing section which frequency-divides the reference frequency signal output from the reference-frequency output section or a signal obtained by multiplying the frequency of the reference frequency signal by a plurality of frequency-dividing ratios, which outputs a plurality of the frequency-divided signals;

a multi-stage frequency conversion section in which a plurality of conversion circuits are connected serially, wherein the plurality of conversion circuits output signals obtained by converting frequencies of input signals based on the frequency-divided signals output from the frequency-dividing section, as conversion signals, and wherein the received signal amplified by the amplification section is supplied to a first stage of the conversion circuits as an input signal;

a detection section which detects a conversion signal output from a final stage of the conversion circuits in the multi-stage frequency conversion section by using, as a reference signal, any one of the frequency-divided signals from the frequency-dividing section;

a time code generating section which generates time information based on detected signals output by the detection section;

a clock section which measures a current time based on reference frequency signals output by the reference-frequency output section; and a time adjusting section which adjusts the current time given by the clock section based on the time information generated by the time code generating section.

20. The radio wave timepiece as claimed in claim 19, wherein the detection section detects a conversion signal output from a stage just before the final stage in the multi-stage frequency conversion section, by using a frequency-divided signal output from the frequency-dividing section as a reference signal.

* * * * *